United States Patent
Arditti Ilitzky et al.

(10) Patent No.: US 9,806,921 B2
(45) Date of Patent: Oct. 31, 2017

(54) COMMUNICATION DEVICE AND METHOD FOR SIGNAL DETERMINATION IN RADIO COMMUNICATION

(71) Applicant: Intel Corporation, Santa Clara, CA (US)

(72) Inventors: David Arditti Ilitzky, Guadalajara (MX); Paulino Mendoza, Zapopan (MX); Thomas Tetzlaff, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/998,117

(22) Filed: Dec. 24, 2015

(65) Prior Publication Data

US 2017/0187554 A1    Jun. 29, 2017

(51) Int. Cl.
*H04L 25/06* (2006.01)
*H04B 1/16* (2006.01)

(52) U.S. Cl.
CPC ......... *H04L 25/065* (2013.01); *H04B 1/1638* (2013.01)

(58) Field of Classification Search
CPC ............... H04L 25/065; H04L 27/0012; H04L 27/2601; H04B 1/1638
See application file for complete search history.

(56) References Cited

U.S. PATENT DOCUMENTS

| | | | |
|---|---|---|---|
| 7,577,122 B1 | 8/2009 | Schultz et al. | |
| 2008/0026704 A1 | 1/2008 | Maeda et al. | |
| 2009/0102981 A1* | 4/2009 | Mody | H04K 3/22 348/732 |
| 2010/0002816 A1* | 1/2010 | Mody | H04L 27/0012 375/350 |
| 2010/0098193 A1* | 4/2010 | Liu | H04L 27/0012 375/340 |
| 2012/0254703 A1* | 10/2012 | Rubin | H04L 1/0046 714/784 |

OTHER PUBLICATIONS

Pedone et al., "Frame Synchronization in Frequency Uncertainty", IEEE Transactions on Communications, Apr. 2010, pp. 1235-1246, vol. 58, No. 4.
Choi et al., "Frame Synchronization in the Presence of Frequency Offset", IEEE Transactions on Communications, Jul. 2002, pp. 1062-1065, Vo. 50, No. 7.

(Continued)

*Primary Examiner* — Syed Haider
(74) *Attorney, Agent, or Firm* — Viering, Jentschura & Partner mbB

(57) ABSTRACT

A mobile communication device is provided that includes a receiver configured to receive a signal. The communication device further includes a calculation circuit configured to determine a cumulant value of an order higher than two of the received signal, to determine a function value of the determined cumulant value and to compare the determined function value with a predefined value. The communication device further includes a decoder configured to decode the received signal. The communication device further includes a target signal detector configured to activate the decoder based on the comparison of the function value with the predefined value.

17 Claims, 12 Drawing Sheets

(56) References Cited

OTHER PUBLICATIONS

Hosseini et al., "Timing, Carrier, and Frame Synchronization of Burst-Mode CPM", IEEE Transactions on Communications, Dec. 2013, pp. 5125-5138, vol. 61, No. 12.

Nikias et al., "Signal Processing with Higher-Order Spectra", IEEE Signal Processing Magazine, Jul. 1993, pp. 10-37.

Schreier et al., "Higher-order spectral analysis of complex signals", Signal Processing, Mar. 20, 2006, pp. 3321-3333, vol. 86, Elsevier B.V.

Extended European Search Report received for the corresponding EP Patent Application 16 198 755.7, dated Jun. 7, 2017, 12 pages.

Grimaldi et al.: "An Automatic Digital Modulation Classifier for Measurement on Telecommunication Networks", IEEE Transactions on Instrumentation and Measurement, Oct. 2007, pp. 1711-1720, vol. 56, No. 5.

Miao et al.: Fourth Order Cumulants in Distinguishing Single Carrier from OFDM Signals, Military Communications Conference, 2008, 6 pages, IEEE.

Young: "Classification of Digital Modulation Types in Multipath Environments", Jun. 2008, 83 pages, Monterey, California.

Gorcin et al.: "An OFDM Signal Identification Method for Wireless Communications Systems", IEEE Transactions on Vehicular Technology, Dec. 2015, pp. 5688-5700, vol. 64, No. 12.

\* cited by examiner

COMMUNICATION DEVICE AND METHOD FOR SIGNAL DETERMINATION IN RADIO COMMUNICATION

TECHNICAL FIELD

The present disclosure relates to communication devices and methods for signal determination in radio communication.

BACKGROUND

In a scenario, a wireless device receives a signal that may either include information packets according to a communication protocol or that may not include any information packets. It may be desirable to provide a communication device and a method that may enable a fast and reliable determination if the received signal includes an information packet of the communication protocol and/or if a decoder of the communication device has to be activated.

SUMMARY

A mobile communication device is provided that includes a receiver configured to receive a signal. The communication device further includes a calculation circuit configured to determine a cumulant value of an order higher than two of the received signal, to determine a function value of the determined cumulant value and to compare the determined function value with a predefined value. The communication device further includes a decoder configured to decode the received signal. The communication device further includes a target signal detector configured to activate the decoder based on the comparison of the determined function value with the predefined value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
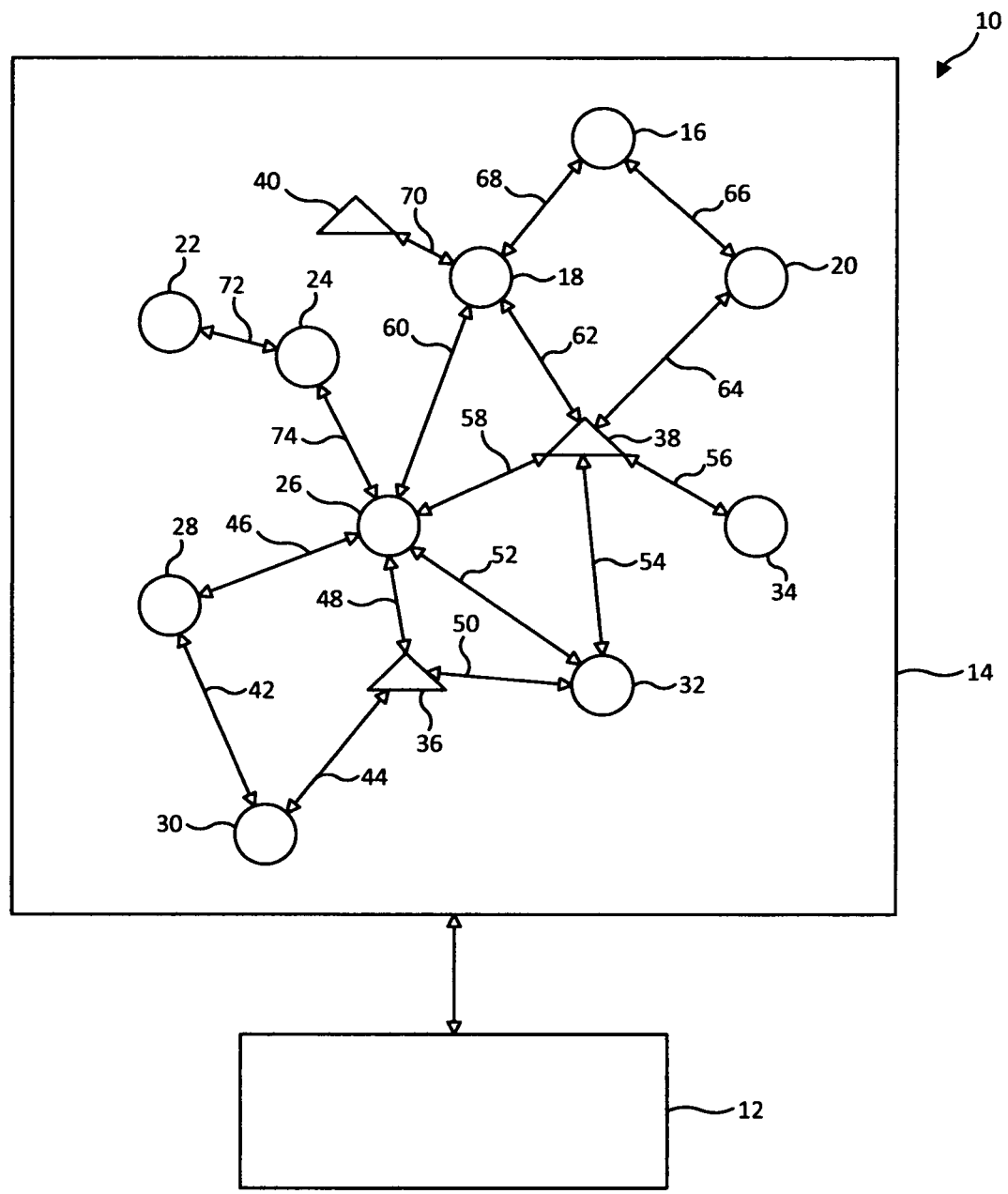
FIG. 1 shows a schematic drawing of a low-power wireless sensor and actor network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Further, the word "information packet" is used herein to mean "data packet". Further, data packets may include message content data, metadata or any other kind of data included in a signal.

A communication device may be provided that determines a statistical property of a received signal to determine if the received signal includes an information signal that may be decoded by a decoder of the communication device. The statistical property may be a property that distinguishes a Gaussian noise signal of the received signal from an information signal that may be included in the received signal. The received signal may be a superposition of the Gaussian noise signal and the information signal. Further, second order statistical properties to determine if the received signal includes an information signal may involve a high computational complexity if the Gaussian noise signal has autocorrelation statistics similar to the statistics of the information signal. A cumulant value of an order higher than two may be a statistical property that enables a reliable and fast distinction between Gaussian noise signals and information signals. The cumulant value may be linear so that the cumulant value of the received signal may be an addition of a cumulant value of the Gaussian noise signal and a cumulant value of the information signal. Further, the cumulant value of the Gaussian noise signal may be zero so that the cumulant value of the received signal may be the cumulant value of the information signal. Moreover, the cumulant value may be robust against correlated Gaussian noise and may involve a low computational complexity so that no time intensive buffering of sample values of the received signal may be required.

Various aspects of this disclosure provide a mobile communication device that includes a receiver configured to receive a signal. Further the communication device may include a calculation circuit that may be configured to determine a cumulant value of an order higher than two of the received signal, to determine a function value of the determined cumulant value and to compare the determined function value with a predefined value. Further, the communication device may include a decoder that may be configured to decode the received signal. Moreover, the communication device may include a target signal detector that may be configured to activate the decoder based on the comparison of the determined function value with the predefined value.

Thus, a simple communication device with a high detection probability of information packets may be provided. Further, the communication device may reliably distinguish received signals that include an information packet from received signals that include Gaussian noise and exclude information packets. The Gaussian noise may be white Gaussian noise and/or correlated Gaussian noise. Moreover, the communication device may be able to activate the decoder within the first symbol periods of an information packet that is included in the received signal. Further, the decoder only consumes energy if the target signal detector has determined to activate the decoder so that the energy consumption of the communication device may be low. A decoder may be a digital signal processing block that is used to detect information symbols included in the received signal. Further, a decoder may be a digital baseband receiver or a baseband receiver. Moreover, an information packet may be a data packet.

In an example, the target signal detector may be configured to activate the decoder when the determined function value is greater than the predefined value. Thus the calculation circuit may be configured in a simple way.

Various aspects of this disclosure provide a communication device that may include a receiver configured to receive a signal. Further, the communication device may include a calculation circuit configured to determine a cumulant value of an order higher than two from the received signal, to determine a function value of the determined cumulant value and to compare the determined function value with a predefined value. Moreover, the communication device may include a target signal detector configured to determine if an information signal is present in the received signal based on the comparison of the determined function value with the predefined value.

Thus a simple communication device with a high detection probability of information signals may be provided. Further, the communication device may reliably distinguish received signals with information signals from signals with Gaussian noise even if the Gaussian noise is correlated. Moreover, the communication device may be able to quickly detect an information signal. The information signal may include an information packet from a predefined communication protocol.

In an example, the received signal may be a baseband signal. Thus, the calculation circuit may be configured in a simple manner.

In an example, the determined function value may be an absolute value of the determined cumulant value. Thus the configuration of the calculation circuit may be simple and the detection of an information packet that is present in the received signal may be reliable.

In an example, the determined cumulant value may be a fourth order cumulant. Thus the activation of the decoder and/or detection of an information signal may be fast and reliable. In some contexts the fourth order cumulant may be known as kurtosis.

In an example, the cumulant may be determined in consideration of a complex valued signal function x based on the received signal, an absolute value $|x|$ of x, a square $(\cdot)^2$ of $(\cdot)$, an expectation operator E that if acting on an argument function determines an expectation value of the argument function, a real part $Re(x)$ of x and an imaginary part $Im(x)$ of x as a fourth order cumulant $\gamma_{4x}=E(|x|^4)-2\cdot(E(|x|^2))^2-(E((Re(x))^2-(Im(x))^2))^2-(E(2\cdot Re(x)\cdot Im(x)))^2$.

Thus, the configuration of the calculation circuit may be simple and a response time of the calculation circuit short.

The complex valued signal function x may be a function of the time. Further, the signal function x may be denoted as $x(t)$.

The argument functions of E may be functions of the time. Further, the expectation value of each argument function of E may be determined by evaluating the argument function at a predefined time. Alternatively, the expectation value of each argument function of E may be determined by obtaining function values by evaluating the argument function at a plurality of times and taking an average of the obtained function values. The average may be an arithmetic mean value. Alternatively, the average may be a weighted arithmetic mean value. Further, the average may be determined as moving average that includes a time dependent selection of values that are considered in the determination of the average. Thus the calculation circuit may be configured in a simple manner.

In an example, the expectation value may be determined by obtaining the function values by evaluating the argument function at the plurality of times and taking the average of the obtained function values. The plurality of times are times within a predefined averaging period. Further, the length of the predefined averaging period is in a range between the length of a single symbol period of a symbol of a predefined communication protocol and the length of four symbol periods of symbols of the predefined communication protocol. Thus, the communication device may be simple and may consume a small amount of energy.

In an example, the expectation value may be determined by obtaining the function values by evaluating the argument function at the plurality of times and taking the average of the obtained function values. The plurality of times are times within a predefined averaging period. Further, the length of the predefined averaging period is in a range between the length of five symbol periods of symbols of a predefined communication protocol and the length of ten symbol periods of symbols of the predefined communication protocol. Thus, the communication device may provide a reliable average and does not consume a very large amount of energy.

In an example, the expectation value may be determined by obtaining the function values by evaluating the argument function at the plurality of times and taking the average of the obtained function values. The plurality of times are times within a predefined averaging period. Further, the length of the predefined averaging period is greater than the length of ten symbol periods of symbols of a predefined communication protocol. Thus, the communication device may provide a very reliable average.

In an example, the cumulant is un-normalized.

In an example, the determined cumulant value is a value of a fourth order cumulant function. Thus, the communication device may activate the decoder and/or determine that an information signal is present in the received signal in a reliable manner. The value of the fourth order cumulant function may be determined by evaluating the function for specified values of its variables and constants.

In an example, the fourth order cumulant function may be defined in consideration of times $t$, $t_1$, $t_2$ and $t_3$, a complex valued signal function $x(t)$ of the time t based on the received signal, the complex conjugate function $x^*(t)$ of $x(t)$, an expectation value operator E that if acting on an argument function determines an expectation value of the argument function and $cum(x^*(t), x(t+t_1), x(t+t_2), x^*(t+t_3))=E(x^*(t)x(t+t_1)x(t+t_2)x^*(t+t_3))-E(x^*(t)x(t+t_1))E(x(t+t_2)x^*(t+t_3))-E$ $(x^*(t)x(t+t_2))E(x(t+t_1)x^*(t+t_3))-E(x^*(t)x^*(t+t_3))E(x(t+t_1)x(t+t_2))$ by $C_{4x}(t, t_1, t_2, t_3)$. Thus, the communication device may activate the decoder and/or determine if the received signal includes an information signal in a reliable manner. The complex conjugate function may have complex conjugate values of x(t). Further, the value of the fourth order cumulant function may be determined by evaluating the function for specific values of t, $t_1$, $t_2$, $t_3$, and x(t).

In an example, an expectation value E(q) of the expectation value operator E acting on a function q may be determined by averaging function values $q(t'_1)$, $q(t'_2)$, ... $q(t'_n)$ obtained by evaluating q at sample times $t'_1, t'_2, \ldots t'_n$. The function q may be one of the signal function x or the complex conjugate function x*·n may be a natural number. Thus, the expectation value may be determined in a simple manner so that the communication device may be simple. The natural number n may be 1.

In an example, the sample times $t'_1, t'_2, \ldots t'_n$ are times within a predefined averaging period. Further, the length of the predefined averaging period is in a range of the length of a single symbol period of a symbol of a predefined communication protocol and the length of four symbol periods of symbols of the predefined communication protocol. Thus, the communication device may be simple. Alternatively, the length of the predefined averaging period is in a range of the length of four symbol periods of symbols of a predefined communication protocol and the length of ten symbol periods of symbols of the predefined communication protocol. Thus, the communication device may be reliable without consuming a large amount of energy. Alternatively, the length of the predefined averaging period is greater than the length of ten symbol periods of symbols of a predefined communication protocol. Thus, the communication device may be very reliable.

In an example, the receiver and/or the decoder may be configured in accordance with single-carrier narrowband modulations. Thus the communication device may activate the decoder and/or determine if the received signal includes an information signal in an effective manner.

In an example, the receiver and/or the decoder may be configured in accordance with at least one signal modulation of a group of signal modulations consisting of: Gaussian Frequency Shift Keying, Gaussian Minimum Shift Keying, and Quadrature Phase Shift Keying.

In an example, the received signal may be a digitized and down-converted radio frequency signal.

In an example, the receiver and/or the decoder may be configured in accordance with a first communication protocol. The calculation circuit may be configured to determine, for example in an initialization phase of the communication device, a first absolute value of a first cumulant value of a first test signal that includes a first noise signal and an information packet of the first communication protocol. Further, the calculation circuit may be configured to determine a second absolute value of a second cumulant value of a second test signal that includes a second noise signal and excludes information packets of the first communication protocol. Moreover, the target signal detector may be configured to define the predefined value to be a value between the first absolute value and the second absolute value. Thus, the predefined value is defined in a simple way and further in such a way that the communication device may reliably activate the decoder and/or determine if the received signal includes an information signal. The predefined value may be defined in an initialization or configuration phase of the communication device. After defining the predefined value the predefined value may be stored in a memory circuit and subsequently be used in comparisons with the determined cumulant value.

In an example, the target signal detector is further configured to define the predefined value to be a value lower than the first absolute value and higher than the second absolute value.

In an example, the receiver and/or the decoder may be configured in accordance with a first communication protocol. Further, the calculation circuit may be configured to determine, for example in an initialization phase of the communication device, first cumulant values of test signals of a first plurality of test signals, respectively. Each test signal of the first plurality of test signals may include a noise signal and an information packet of the first communication protocol. Moreover, the calculation circuit may be configured to determine first absolute values of the first cumulant values, respectively. The calculation circuit may be configured to determine second cumulant values of test signals of a second plurality of test signals, respectively. Each test signal of the second plurality of test signals may include a noise signal and exclude information packets of the first communication protocol. The calculation circuit may be configured to determine second absolute values of the second cumulant values, respectively. Further, the target signal detector may be configured to define the predefined value to be a value between the lowest first absolute value and the highest second absolute value. Thus, the target signal detector may define a predefined value in such a way that the communication device may activate the decoder and/or determine that the received signal includes an information signal in a reliable manner. Each test signal of the first and/or second plurality of test signals may include a noise signal from a plurality of noise signals. The noise signals from the plurality of noise signals may be different from each other. Each test signal of the first plurality of test signals may include an information packet from a plurality of information packets of the first communication protocol. The information packets from the plurality of information packets of the first communication protocol may be different from each other.

In an example, the receiver and/or the decoder may be configured in accordance with a second communication protocol. The second test signal may exclude information packets of the second communication protocol. The calculation circuit may be configured to determine, for example in an initialization phase of the communication device, a third absolute value of a third cumulant value of a third test signal that includes a third noise signal and an information packet of the second communication protocol. The calculation circuit may be configured to determine a fourth absolute value of a fourth cumulant value of a fourth test signal that includes a fourth noise signal and excludes information packets of the first communication protocol and the second communication protocol. The target signal detector may be configured to define the predefined value to be a value between the lower value of the first absolute value and the third absolute value and the higher value of the second absolute value and the fourth absolute value. Thus the communication device may be flexibly used in communications that include more than one communication protocol.

In an example, the receiver and/or the decoder may be configured in accordance with a first communication protocol. The target signal detector may be configured to define the predefined value, for example in an initialization phase of the communication device, based on a first definition information and a second definition information. The first definition information may include a first plurality of test signals that each include a noise signal and an information packet of the first communication protocol. The first definition information may include a first plurality of detection error numbers that are associated with threshold values of a plurality of threshold values, respectively. The target signal detector may be configured to determine each detection error number of the first plurality of detection error numbers to be a number of detection errors that occur by using the test signals of the first plurality of test signals as received signals and by using the threshold value that is associated with the each detection error number as predefined value. Further, the second definition information may include a second plurality of test signals that each include a noise signal and exclude information packets of the first communication protocol. The second definition information may include a second plurality of detection error numbers that are associated with threshold values of the plurality of threshold values, respectively. The target signal detector may be configured to determine each detection error number of the second plurality of detection error numbers to be a number of detection errors that occur by using the test signals of the second plurality of test signals as received signals and by using the threshold value that is associated with the each detection error number as predefined value. The target signal detector may be configured to define the predefined value to be the value of the plurality of threshold values that has the smallest sum of a plurality of sums. Each sum of the plurality of sums may be associated with a threshold value of the plurality of threshold values and may be the sum of the detection error numbers of the first plurality of detection error numbers and the second plurality of detection error numbers that are associated with the threshold value that the sum is associated with. Thus, the target signal detector may define the predefined value in such a way that the communication device may reliably activate the decoder and/or determine if the received signal includes an information signal. In the case that the communication device determines if the received signal includes an information signal the detection error may occur if the target signal detector determines that no information signal is present in the test signals of the first plurality of test signals and/or if the target signal detector determines that an information signal is present in the test signals of the second plurality of test signals. In case that the target signal detector activates the decoder the detection error may occur if the target signal detector does not activate the decoder if the received signal is one of the test signals of the first plurality of test signals and/or if the target signal detector activates the decoder if the received signal is one of the test signals of the second plurality of test signals. In other words, a detection error occurs if the received signal includes an information packet and the presence of an information packet is not detected and if the signal does not include an information packet and the presence of an information packet is detected. Further, instead of the smallest sum of the plurality of sums the smallest number of detection errors that are included in one standard deviation, two standard deviations, three standard deviations around the mean detection error or that are included in 99% of the detection errors may be used as basis for the definition of the predefined value. Moreover, the predefined value may be defined to be in a region that includes the smallest sum of numbers of detection errors instead of defining the predefined value as the smallest sum of numbers of detection errors.

In an example, the receiver and/or the decoder may be configured in accordance with a first communication protocol and a second communication protocol. The target signal detector may be configured to define the predefined value, for example in an initialization phase of the communication device, based on a first definition information, a second definition information, a third definition information and a fourth definition information. The first definition information may include a first plurality of test signals that each include a noise signal and an information packet of the first communication protocol. The first definition information may include a first plurality of detection error numbers that are associated with threshold values of a plurality of threshold values, respectively. The target signal detector may be configured to determine each detection error number of the first plurality of detection error numbers to be a number of detection errors that occur by using the test signals of the first plurality of test signals as received signals and by using the threshold value that is associated with the each detection error number as predefined value. The second definition information may include a second plurality of test signals that each include a noise signal and exclude information packets of the first communication protocol. The second definition information may include a second plurality of detection error numbers that are associated with threshold values of the plurality of threshold values, respectively. Further, the target signal detector may be configured to determine each detection error number of the second plurality of detection error numbers to be a number of detection errors that occur by using the test signals of the second plurality of test signals as received signals and by using the threshold value that is associated with the each detection error number as predefined value. Moreover, the third definition information may include a third plurality of test signals that each include a noise signal and an information packet of the second communication protocol. The third definition information may include a third plurality of detection error numbers that are associated with threshold values of the plurality of threshold values, respectively. Further, the target signal detector may be configured to determine each detection error number of the third plurality of detection error numbers to be a number of detection errors that occur by using the test signals of the third plurality of test signals as received signals and by using the threshold value that is associated with the each detection error number as predefined value. Moreover, the fourth definition information may include a fourth plurality of test signals that each include a noise signal and exclude information packets of the second communication protocol. The fourth definition information may include a fourth plurality of detection error numbers that are associated with threshold values of the plurality of threshold values, respectively. The target signal detector may be configured to determine each detection error number of the fourth plurality of detection error numbers to be a number of detection errors that occur by using the test signals of the fourth plurality of test signals as received signals and by using the threshold value that is associated with the each detection error number as predefined value. Further, the target signal detector may be configured to define the predefined value to be a value between a first value and a second value. The first value may be a value of the plurality of threshold values that has the smallest sum of a first plurality of sums. Each sum of the first plurality of sums may be associated with a threshold value of the plurality of threshold values and may be the sum of the detection error numbers of the first plurality of detection error numbers and the second plurality of detection error numbers that are associated with the threshold value that the sum is associated with. The second value may be a value of the plurality of threshold values that has the smallest sum of a second plurality of sums. Each sum of the second plurality of sums may be associated with a threshold value of the plurality of threshold values and may be the sum of the detection error numbers of the third plurality of detection error numbers and the fourth plurality of detection error numbers that are associated with the threshold value that the sum is associated with. Thus, the target signal detector defines the predefined value in such a way that the communication device may reliably activate the decoder and/or determine if the received signal includes information signal in case that the communication device is configured in accordance with two communication protocols.

In an example, the predefined communication protocol, the first communication protocol and/or the second communication protocol may be communication protocols of a group of communication protocols consisting of: ANT, Bluetooth, Bluetooth Low Energy, ZigBee and Global System for Mobile Communications.

Furthermore, various aspects of this disclosure provide a network arrangement, including at least one wireless sensor and actor network including a plurality of communication devices connected with each other via a wireless connection. Each communication device of the plurality of communication devices may include a receiver configured to receive a signal. Further, each communication device of the plurality of communication devices may include a calculation circuit configured to determine a cumulant value of an order higher than two of the received signal, to determine a function value of the determined cumulant value and to compare the determined function value with a predefined value. Further, each communication device of the plurality of communication devices may include a decoder configured to decode the received signal and a target signal detector configured to activate the decoder based on the comparison of the determined function value with the predefined value. Thus a simple network arrangement, including at least one wireless sensor and actor network and a communication device with a high detection probability of information packets may be provided. Further, the communication devices of the wireless sensor and actor network may reliably distinguish received signals that include an information packet from received signals that include Gaussian noise and exclude information packets. The Gaussian noise may be white Gaussian noise and/or correlated Gaussian noise. Moreover, the wireless sensor and actor network may have communication devices that may be able to activate the decoder within the first symbol periods of an information packet that is included in the received signal. Further, the decoder only consumes energy if the target signal detector has determined to activate the decoder so that the energy consumption of the communication device may be low.

In an example, the wireless sensor and actor network may be a low-power wireless sensor and actor network.

In an example, the receiver and/or the decoder may be configured in accordance with a first communication protocol. Further, the target signal detector may be further configured to define the predefined value based on a plurality of threshold values and a plurality of distributions of detection index error numbers that are associated with the threshold values of the plurality of threshold values, respectively. The detection index error numbers of each distribution of detection index error numbers may be associated with test signals of a plurality of test signals, respectively. Each test signal of the plurality of test signals may include a plurality of sample signals that are associated with consecutively ordered sample signal numbers. Each plurality of sample signals may include a first sample signal that may include an information packet of the first communication protocol and the other sample signals of the each plurality of sample signals may exclude information packets of the first communication protocol. Further, the calculation circuit may be configured to determine a sample cumulant value of an order higher than two of each sample signal of the pluralities of sample signals, to determine the function value of each cumulant value of the cumulant values and to compare the determined function values with the threshold values, respectively. The target signal detector may be configured to determine a second sample signal of each plurality of sample signals of the pluralities of sample signals that has the lowest sample signal number of excess sample signals of the each plurality of sample signals that have greater determined function values than the threshold value, respectively. Further, the target signal detector may be configured to determine the detection index error number associated with each test signal of the plurality of test signals to be the sample signal number of the second sample signal minus the sample signal number of the first sample signal. Moreover, the target signal detector may be configured to predefine the predefined value as a threshold value that is associated with the distribution of detection index error numbers that has the lowest variance. Thus, the target signal detector may be configured to define the predefined value in such a way that the communication device may reliably activate the decoder and/or determine if the received signal includes information signal.

Furthermore, a method for signal determination in radio communication may be provided that includes receiving a signal. Further, a cumulant value of an order higher than two of the received signal may be determined. Moreover, a function value of the determined cumulant value may be determined. Further, the determined function value may be compared with a predefined value. Further, a decoder configured to decode the received signal based on the comparison of the determined function value with the predefined value may be activated. Thus, a simple method with a high detection probability of information packets may be provided. Further, the method may reliably distinguish received signals that include an information packet from received signals that include Gaussian noise and exclude information packets. The Gaussian noise may be white Gaussian noise and/or correlated Gaussian noise. Moreover, the method may be able to activate the decoder within the first symbol periods of an information packet that is included in the received signal. Further, the decoder only consumes energy if the decoder is activated so that the energy consumption may be reduced.

Furthermore, a method for signal determination in radio communication may be provided that includes receiving a signal. Further, a cumulant value of an order higher than two of the received signal may be determined. Moreover, a function value of the determined cumulant value may be determined. Further, the determined function value may be compared with a predefined value. Moreover, it may be determined if an information signal is present in the received signal based on the comparison of the determined function value with the predefined value. Thus, a simple method with a high detection probability of information packets may be provided. Further, the method may reliably distinguish received signals that include an information packet from received signals that include Gaussian noise and exclude information packets. The Gaussian noise may be white Gaussian noise and/or correlated Gaussian noise. Moreover, the method may be able to determine in a fast manner if an information signal is present in the received signal. The information signal may include an information packet from a predefined communication protocol.

It should be noted that aspects described in the context of the previous examples may be analogously valid for the above provided methods.

FIG. 1 shows a schematic drawing of a low-power wireless sensor and actor network 10 (LP-WSAN) that may include a base station 12 and a network 14 of a plurality of sensors 16 to 34 and actors 36 to 40. Each sensor of the sensors 16 to 34 may be connected to at least another sensor of the plurality of sensors 16 to 34 and/or actor of the plurality of actors 36 to 40 via a radio frequency connection. Each actor of the plurality of actors 36 to 40 may be connected to at least one sensor of the plurality of sensors 16 to 34 and/or another actor of the plurality of actors 36 to 40 via a radio frequency connection. The connections between sensors and actors are indicated in FIG. 1 by arrows 42 to 74, respectively. Further, the base station 12 may be connected to at least one of the sensors 16 to 34 and/or to at least one of the actors 36 to 40 via a radio frequency connection and may be responsible for monitoring and managing the overall network 14 of the sensors 16 to 34 and the actors 36 to 40.

Figure 2:
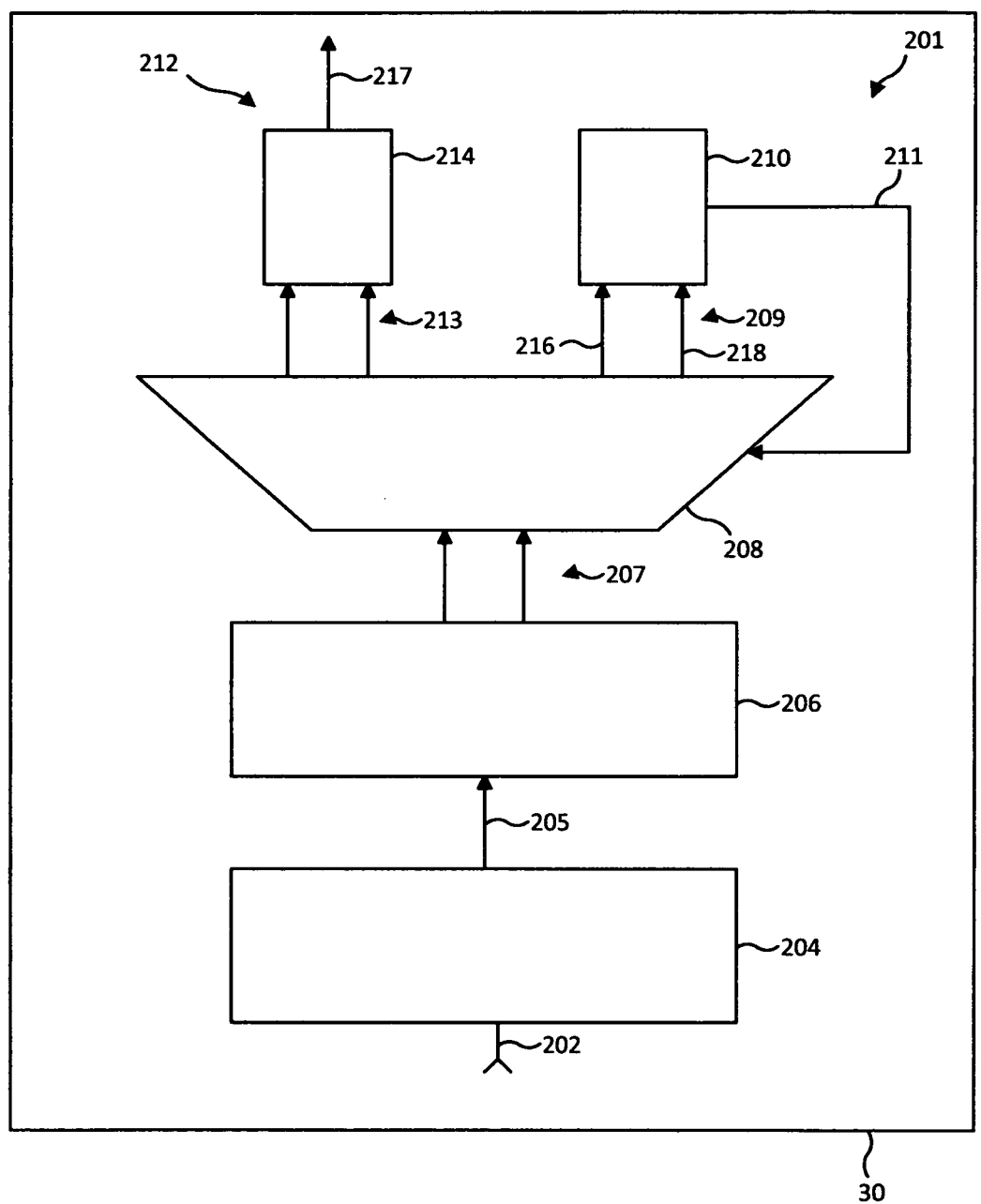
FIG. 2 shows a schematic drawing of the sensor of the network according to an example.

FIG. 2 shows a schematic drawing of the sensor 30 of the network 14 according to an example. The sensor 30 may include an antenna 202, an analog front end 204, a digital front end 206, a demultiplexer 208, a calculation circuit 210 and a decoder 212. The antenna 202, the analog front end 204, the digital front end 206, the demultiplexer 208 and the calculation circuit 210 may be included in a target signal detector 201. The antenna 202 may be configured to receive a radio frequency signal and to transmit the radio frequency signal to the analog front end 204. The analog front end 204 may include a front end module that may be configured to convert the received radio frequency signal to a baseband signal. The front end module may be connected to an analog to digital converter of the digital front end 206 via a first connection 205 and may be configured to transmit the baseband signal to the analog to digital converter.

The digital front end 206 may further include an equalizer and may be connected to a demultiplexer 208 via a second connection 207. Further, the digital front end 206 may be configured to receive the baseband signal from the analog front end 204, to digitize and equalize the received baseband signal and to generate a first signal $x_I$ that is the real part of the digitized and equalized signal and a second signal $x_Q$ that is the imaginary part of the digitized and equalized signal. The digital front end 206 may be configured to transmit the first signal $x_I$ and the second signal $x_Q$ via a first data line of the second connection 207 and a second data line of the second connection 207 to the demultiplexer 208, respectively.

The demultiplexer 208 may be connected to the calculation circuit 210 via a third connection 209 and a fourth connection 211 and to a coherency acquisition circuit 214 of the decoder 212 via a fifth connection 213. Moreover, the demultiplexer 208 may be configured to transmit the first signal $x_I$ via a first data line 216 of the third connection 209 and the second signal $x_Q$ via a second data line 218 of the third connection 209 to the calculation circuit 210. The calculation circuit 210 may be configured to generate an output signal based on the first signal $x_I$ and the second signal $x_Q$ and to transmit the output signal via the fourth connection 211 to the demultiplexer 208.

Further, the demultiplexer 208 may be configured to activate the decoder 212 based on the output signal of the calculation circuit 210. Moreover, the demultiplexer 208 is configured to transmit the first signal $x_I$ and the second signal $x_Q$ to the coherency acquisition circuit 214 if the decoder 212 has been activated. The coherency acquisition circuit 214 may include a first bit target signal detector and may be connected to a Viterbi decoder of the decoder 212 via a sixth connection 217. The coherency acquisition circuit 214 may be configured to transmit the first signal $x_I$ and the second signal $x_Q$ via the sixth connection 217 to the Viterbi decoder if a coherency of the data of the signals $x_I$ and $x_Q$ has been acquired.

Figure 3:
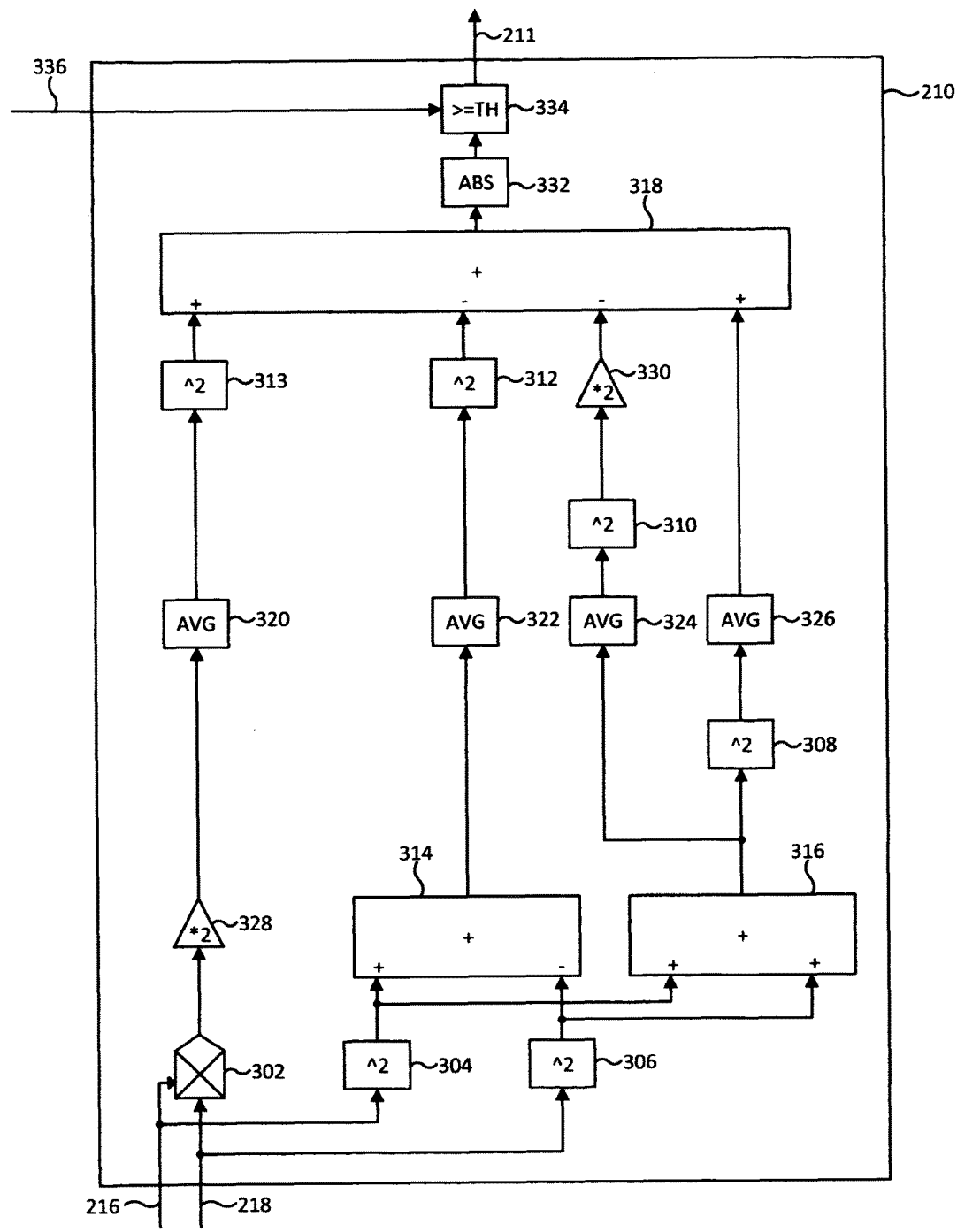
FIG. 3 shows a schematic drawing of an example of a calculation circuit of the sensor according to the example of FIG. 2.

FIG. 3 shows a schematic drawing of the calculation circuit 210. The calculation circuit 210 may be specifically adapted to calculate a fourth order cumulant, i.e. a kurtosis. In case of a wireless device that may be configured to determine a third order cumulant, i.e. a skewness, or a cumulant of an order higher than four the calculation circuit of the wireless device may be adapted accordingly.

The calculation circuit 210 may include a signal multiplication circuit 302, six quadrature circuits from which a first quadrature circuit, a second quadrature circuit, a third quadrature circuit, a fourth quadrature circuit, a fifth quadrature circuit and a sixth quadrature circuit have reference numerals 304, 306, 308, 310, 312 and 313, respectively. Further, the calculation circuit 210 may include a first addition circuit 314, a second addition circuit 316, a third addition circuit 318, a first averaging circuit 320 a second averaging circuit 322, a third averaging circuit 324, a fourth averaging circuit 326, a first multiplication circuit 328, a second multiplication circuit 330, an absolute value circuit 332 and a comparison circuit 334.

The signal multiplication circuit 302 may be connected to the data lines 216 and 218 and may be configured to generate an output signal that is a multiplication of the first signal $x_I$ with the second signal $x_Q$. Further, the signal multiplication circuit 302 may be connected to the first multiplication circuit 328. The first multiplication circuit 328 may be configured to receive the output signal of the signal multiplication circuit 302 and to generate an output signal that is a multiplication of the received output signal with two. The first multiplication circuit 328 may be connected to the first averaging circuit 320. The first averaging circuit 320 may be configured to receive the output signal from the first multiplication circuit 328 and to generate an output signal that is an average of the received output signal. The first averaging circuit 320 may be connected to the sixth quadrature circuit 313. The sixth quadrature circuit 313 may be configured to receive the output signal of the first averaging circuit 320 and to generate an output signal that is a quadrature of the received output signal. The sixth quadrature circuit 313 may be connected to the third addition circuit 318.

Moreover, the first data line 216 may further be connected to the first quadrature circuit 304. The first quadrature circuit 304 may be configured to receive the first signal $x_I$ and to generate an output signal that is a quadrature of the first signal $x_I$. The first quadrature circuit 304 may be connected to the first addition circuit 314 and the second addition circuit 316. Moreover, the second data line 218 may further be connected to the second quadrature circuit 306. The second quadrature circuit 306 may be configured to receive the second signal $x_Q$ and to generate an output signal that is a quadrature of the second signal $x_Q$. The second quadrature circuit 306 may be connected to the first addition circuit 314 and the second addition circuit 316.

The first addition circuit 314 may be configured to receive the output signals of the first quadrature circuit 304 and the second quadrature circuit 306 and to generate an output signal that is a subtraction of the output signal of the second quadrature circuit 306 from the output signal of the first quadrature circuit 304. Further, the first addition circuit 314 may be connected to the second averaging circuit 322. The second averaging circuit 322 may be configured to receive the output signal of the first addition circuit 314 and to generate an output signal that is an average of the received output signal. The second averaging circuit 322 may be connected to the fifth quadrature circuit 312. The fifth quadrature circuit 312 may be configured to receive the output signal of the second averaging circuit 322 and to generate an output signal that is a quadrature of the received output signal. The fifth quadrature circuit 312 may be connected to the third addition circuit 318.

Further, the second addition circuit 316 may be configured to receive the output signals of the first quadrature circuit 304 and the second quadrature circuit 306 and to generate an output signal that is the addition of the output signal of the first quadrature circuit 304 and the output signal of the second quadrature circuit 306. Moreover, the second addition circuit 316 may be connected to the third quadrature circuit 308 and the third averaging circuit 324. The third averaging circuit 324 may be configured to receive the output signal of the second addition circuit 316 and to generate an average of the received output signal. The third averaging circuit 324 may be connected to the fourth quadrature circuit 310. The fourth quadrature circuit 310 may be configured to receive the output signal of the third averaging circuit 324 to generate an output signal that is a quadrature of the received output signal. The fourth quadrature circuit 310 may be connected to the second multiplication circuit 330. The second multiplication circuit 330 may be configured to receive the output signal of the fourth quadrature circuit 310 and to generate an output signal that is the multiplication of the received output signal with two. The second multiplication circuit 330 may be connected to the third addition circuit 318.

Further, the third quadrature circuit 308 may be configured to receive the output signal of the second addition circuit 316 and to generate an output signal that is the quadrature of the received output signal. The third quadrature circuit 308 may be connected to the fourth averaging circuit 326. The fourth averaging circuit 326 may be configured to receive the output signal of the third quadrature circuit 308 and to generate an output signal that is an average of the received output signal. The fourth averaging circuit 326 may be connected to the third addition circuit 318.

The third addition circuit 318 may be configured to generate an output signal that is an addition of the output signal of the sixth quadrature circuit 313, a negative signal of the output signal of the fifth quadrature circuit 312, a negative signal of the second multiplication circuit 330 and the output signal of the fourth averaging circuit 326. Further, the third addition circuit 318 may connected to the absolute value circuit 332.

The absolute value circuit 332 may be configured to receive the output signal of the third addition circuit 318 and to generate an output signal that is the absolute value of the received output signal. Moreover, the absolute value circuit 332 may be connected to the comparison circuit 334. The comparison circuit 334 may be configured to receive the output signal of the absolute value circuit 332, to compare the received output signal to a threshold value T (predefined value) and to generate the output signal of the calculation circuit 210 in such a way that the output signal of the calculation circuit 210 includes an indication flag that indicates a positive detection result if the received output signal is greater or equal to the threshold value T and that indicates a negative detection result if the received output signal is smaller than the threshold value T. The threshold value T may be stored in a memory circuit of the calculation circuit 210 and may be updated via a connection 336 between the comparison circuit 334 and a threshold value T determination circuit.

Further, the indication flag of the output signal of the calculation circuit 210 may be determined in consideration of a fourth order cumulant $\gamma_{4x}$ and the threshold value T by a comparison formula (1):

$$|\gamma_{4x}| \geq T. \qquad (1)$$

The calculation circuit 210 may be configured to determine that the indication flag of the output signal of the calculation circuit 210 indicates a positive detection result if the comparison formula (1) is true and a negative detection result if the comparison formula (1) is false.

The fourth order cumulant $\gamma_{4x}$ of comparison formula (1) may be determined in consideration of a complex valued signal function x that is a function of the time, an absolute value |x| of the signal function x, an expectation operator E that if acting on an argument function determines an expectation value of the argument function, a real part Re(x) of x and an imaginary part Im(x) of x by a formula (2):

$$\gamma_{4x} = E(|x|^4) - 2\cdot(E(|x|^2))^2 - (E((Re(x))^2 - (Im(x))^2))^2 - (E(2\cdot Re(x)\cdot Im(x)))^2. \qquad (2)$$

The signal function x of formula (2) may be determined in consideration of the first signal $x_I$, the second signal $x_Q$ and the imaginary unit j by a formula (3):

$$x = x_I + j\cdot x_Q. \qquad (3)$$

Figure 4:
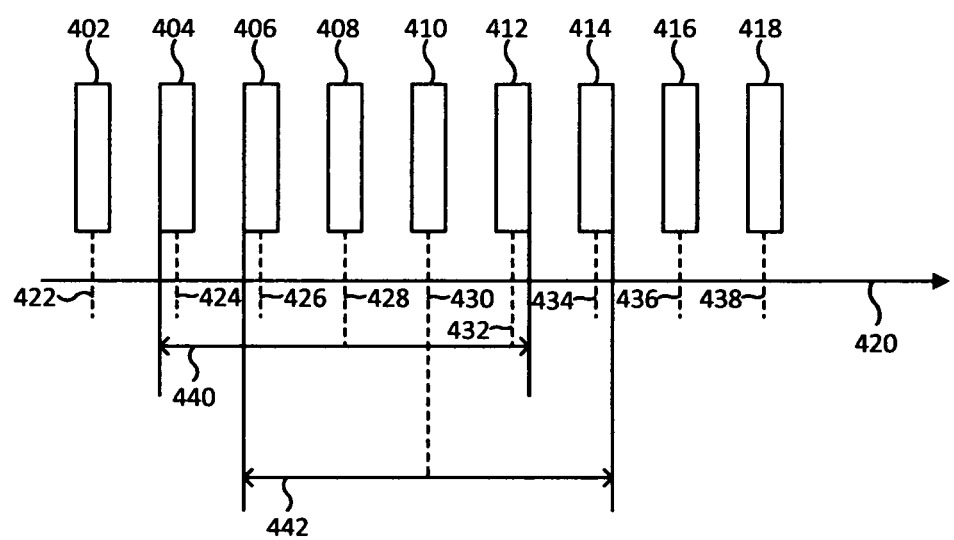
FIG. 4 a schematic drawing illustrating the generation of output signals of averaging circuits of the calculation circuit.

FIG. 4 shows a schematic drawing illustrating the generation of the output signals of the averaging circuits 320, 322, 324 and 326. Each averaging circuit of the averaging circuits 320, 322, 324 and 326 may be configured to receive an input signal that includes data samples 402, 404, 406, 408, 410, 412, 414, 416 and 418 in a consecutive order in time as indicated by the time axis 420. The data samples 402, 404, 406, 408, 410, 412, 414, 416 and 418 may be associated with sample times 422, 424, 426, 428, 430, 432, 434, 436 and 438, respectively. The sample times 422, 424, 426, 428, 430, 432, 434, 436 and 438 are also referred to by $t_1$, $t_2$, $t_3$, $t_4$, $t_5$, $t_6$, $t_7$, $t_8$ and $t_9$, respectively.

The data samples 404 to 412 may be included in a first time window 440 that is associated with a first averaging time that coincides with the sample time 428 and is referred to by the same reference numeral. The output signal of the first averaging circuit 320 at the first averaging time 428 may be the arithmetic mean of the values of $2\cdot Re(x(t_2))\cdot Im(x(t_2))$, $2\cdot Re(x(t_3))\cdot Im(x(t_3))$, $2\cdot Re(x(t_4))\cdot Im(x(t_4))$, $2\cdot Re(x(t_5))\cdot Im(x(t_5))$ and $2\cdot Re(x(t_6))\cdot Im(x(t_6))$ which may be the expectation value $E(2\cdot Re(x)\cdot Im(x))$ of formula (2) determined at the first averaging time 428.

Further, the data samples 406 to 414 may be associated with a second time window 442. The second time window 442 is associated with a second averaging time that coincides with the sample time 430 and is referred to by the same reference numeral. The output signal of the first averaging circuit 320 at the second averaging time 430 may be the arithmetic mean of the values of $2\cdot Re(x(t_3))\cdot Im(x(t_3))$, $2\cdot Re(x(t_4))\cdot Im(x(t_4))$, $2\cdot Re(x(t_5))\cdot Im(x(t_5))$, $2\cdot Re(x(t_6))\cdot Im(x(t_6))$ and $2\cdot Re(x(t_7))\cdot Im(x(t_7))$ which may be the expectation value $E(2\cdot Re(x)\cdot Im(x))$ of formula (2) determined at the second averaging time 430.

Figure 5:
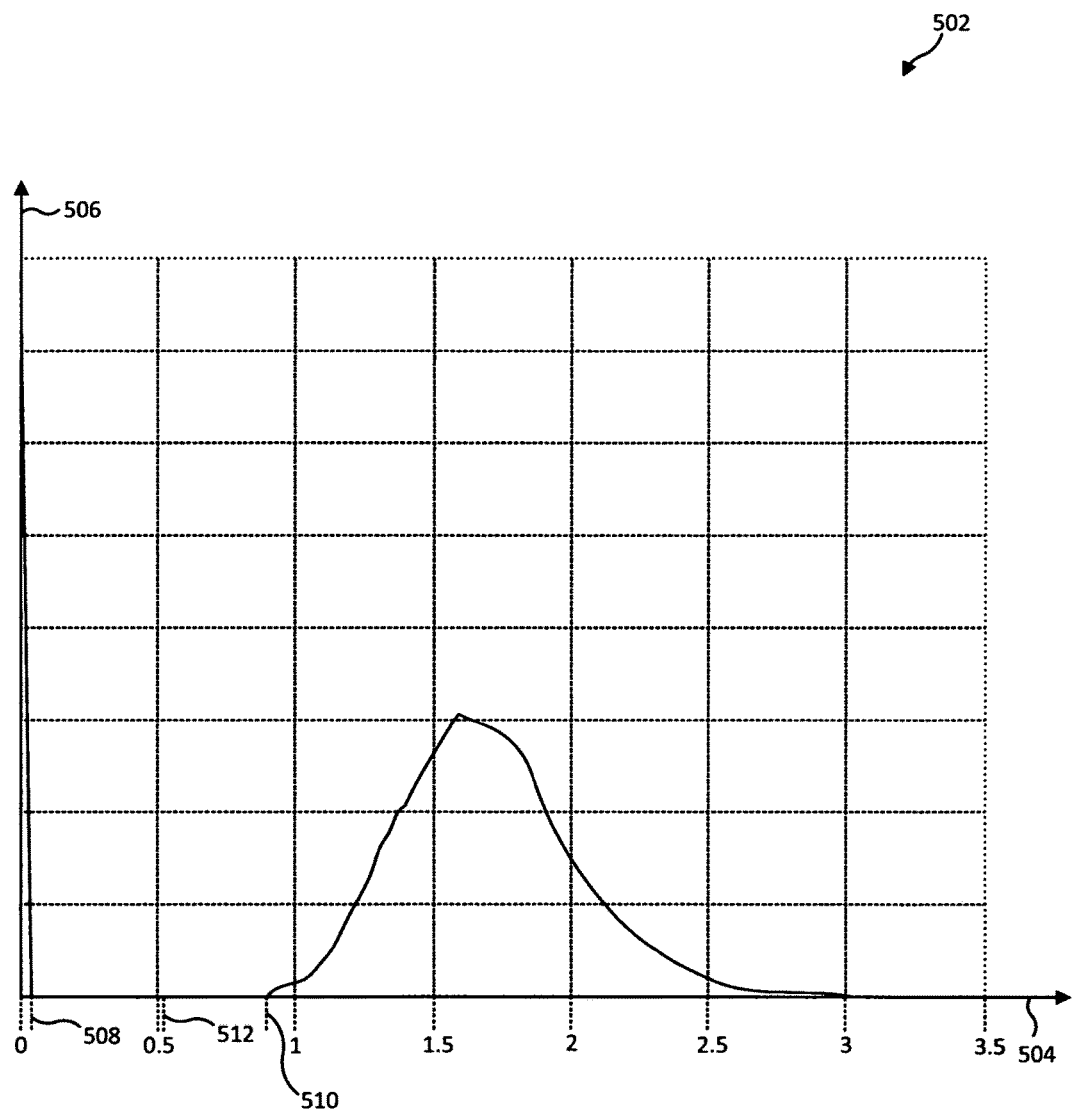
FIG. 5 is a diagram that shows an enveloping curve of a histogram of absolute values of fourth order cumulants of a first plurality of sample signals, respectively.

FIG. 5 is a diagram 502 that shows an enveloping curve of a histogram of absolute values of the fourth order cumulants $|\gamma_{4x}|$ of a first plurality of sample signals, respectively. The diagram 502 has a first axis 504 that indicates the absolute values of the fourth order cumulants $|\gamma_{4x}|$ and a second axis 506 that indicates the frequency that the absolute value of the fourth order cumulant $|\gamma_{4x}|$ indicated by the first axis 504 has been determined as absolute value of the fourth order cumulant $|\gamma_{4x}|$ of the sample signals of the first plurality of sample signals.

Each sample signal of the first plurality of sample signals may either include an information packet of a first communication protocol or exclude information packets of the first communication protocol. The absolute values of the fourth order cumulants $|\gamma_{4x}|$ of sample signals that exclude information packets of the first communication protocol, respectively, may be smaller than a first value 508. In the example of the determination of the absolute value of the fourth order cumulant $|\gamma_{4x}|$, the first value may be 0.03. The absolute values of the fourth order cumulants $|\gamma_{4x}|$ of sample signals that include information packets of the first communication protocol, respectively, may be greater than a second value 510. In the example of the determination of the absolute value of the fourth order cumulant $|\gamma_{4x}|$, the second value 510 may be 0.86.

Further, the threshold value T may be predefined as a third value 512 that is greater than the first value 508 and smaller than the second value 510. The third value 512 may be predefined as arithmetic mean of the first value 508 and the second value 510. Alternatively, the third value 512 may be any of the values between the first value 508 and the second value 510.

Figure 6:
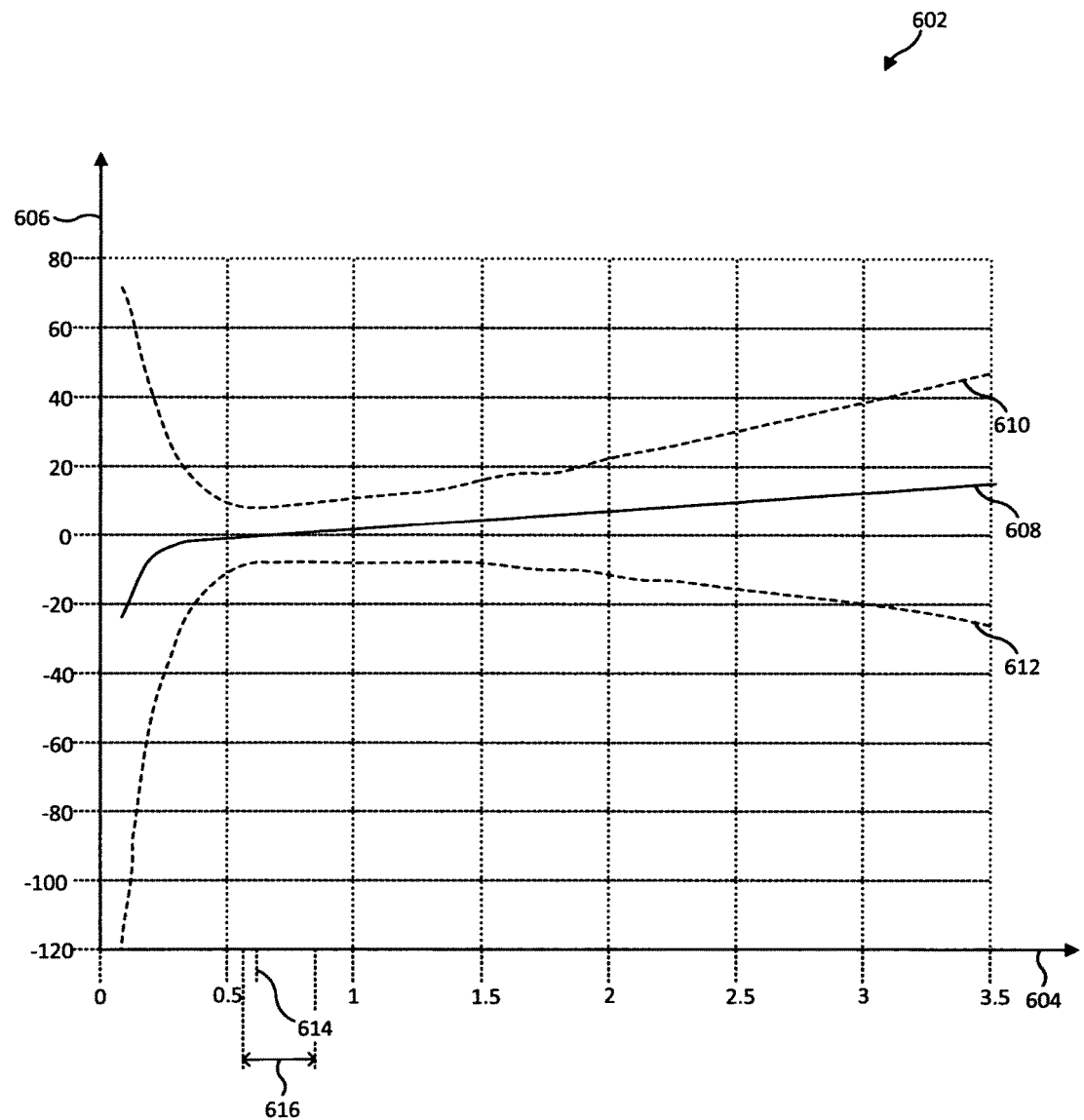
FIG. 6 is a diagram that shows a distribution of detection error numbers that is associated with a third plurality of second pluralities of sample signals.

FIG. 6 is a diagram 602 that shows distributions of detection index error numbers which are associated with second pluralities of test signals, respectively. The test signals of each second plurality of test signals may have a first signal to noise ratio, respectively.

Further, the diagram 602 has a first axis 604 that may indicate threshold values and a second axis 606 that may indicate detection index error numbers of the distributions of detection index error numbers. The distributions of detection index error numbers may be distributed parallel to the second axis 606. The detection index error numbers of each distribution of detection index error numbers may be associated with the test signals of the second plurality of test signals that is associated with the each distribution of detection index error numbers. The test signals of each second plurality of test signals may include pluralities of sample signals, respectively. The sample signals of each second plurality of test signals may be associated with consecutively ordered sample signal numbers, respectively. Further, each plurality of sample signals of each test signal may include a first sample signal that may include an information packet of the first communication protocol. The other sample signals of the each plurality of sample signals may exclude information packets of the first communication protocol.

Further, the calculation circuit 210 may be configured to determine the absolute value of the fourth order cumulant $|\gamma_{4x}|$ of each sample signal of each plurality of sample signals. Moreover, the calculation circuit 210 may be configured to determine excess signals of the plurality of sample signals of each test signal to be the sample signals that have a greater absolute value of the fourth order cumulant $|\gamma_{4x}|$ than the threshold value that the test signal is associated with. Further, the calculation circuit 210 may be configured to determine each detection index error number to be the lowest sample signal number of the excess signals minus the sample signal number of the first sample signal.

Further, the diagram 602 has a first curve 608 that depends on the threshold values indicated by the first axis 604 and that indicates an arithmetic mean value of the distribution of detection index error numbers. Moreover, the diagram 602 has a dashed second curve 610 and a dashed third curve 612. The second curve 610 may indicate a positive first deviation of the distribution of detection index error numbers. The third curve 612 may indicate a negative second deviation of the distribution of detection index error numbers. A distance of a first point of the second curve 610 and a second point of the third curve 612 that are associated with the same threshold value may be associated with a third deviation of the distribution of detection index error numbers from the arithmetic mean. The third deviation may correspond to three standard deviations. In other words, more than 99% of the detection index error numbers of the distribution of detection index error numbers that are included in the diagram 602 may be included between the second curve 610 and the third curve 612.

The threshold value T may be predefined to be the threshold value that is associated with the smallest third deviation. The smallest third deviation may be a second threshold value 614. Further, the threshold value T may be predefined as a value in a first region 616 of threshold values that includes threshold values that have similar third deviations as the smallest third deviation, respectively.

In an example, the sensor 30 of FIG. 2 may be an actuator of the low-power wireless sensor and actor network 10. All other aspects of the actuator correspond to those of the sensor 30 of FIG. 2.

Figure 7:
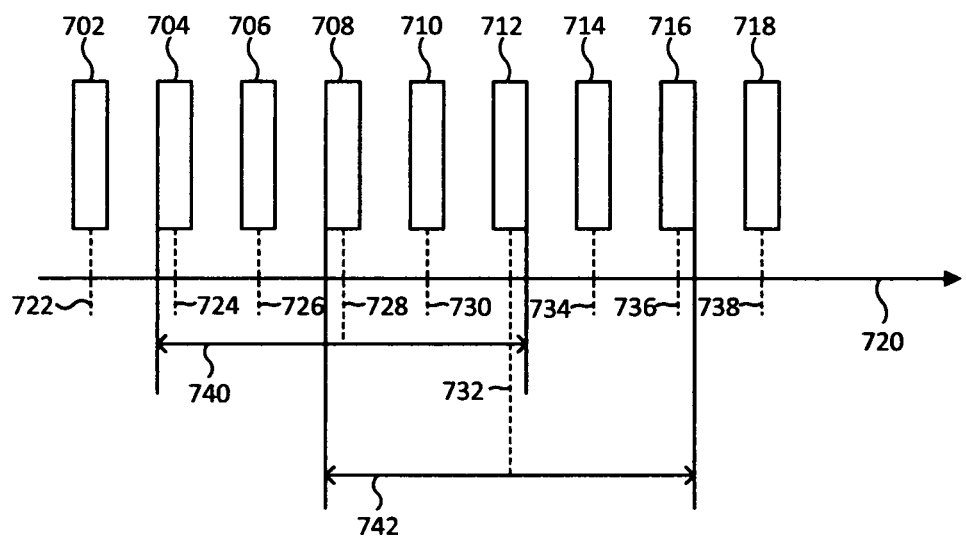
FIG. 7 shows a schematic drawing illustrating the generation of the output signals of averaging circuits of a calculation circuit of a sensor according to an example.

FIG. 7 shows a schematic drawing illustrating the generation of the output signals of averaging circuits 720, 722, 724 and 726 of a calculation circuit 710 of a communication device according to an example. Features of the example of FIG. 7 that correspond to those of the example of FIG. 2 are indicated by the same reference numerals.

The communication device according to the example of FIG. 7 may sample data at twice the data rate of the sensor 30 according to the example of FIG. 2. The data samples sampled by the communication device according to the example of FIG. 7 at times 722, 724, 726, 728, 730, 734, 736 and 738 have reference numerals 702, 704, 706, 708, 710, 712, 714, 716 and 718, respectively. The sample times 722, 724, 726, 728, 730, 732, 734, 736 and 738 are also referenced by $t'_1$, $t'_2$, $t'_3$, $t'_4$, $t'_5$, $t'_6$, $t'_7$, $t'_8$ and $t'_9$, respectively.

The data samples 704 to 712 are sampled within a first time window 740 that is associated with a first averaging time that coincides with the sample time 728 and is referenced by the same reference numeral. The output signal of the first averaging circuit 720 at the first averaging time 728 may be the arithmetic mean of the values of $2 \cdot \text{Re}(x(t'_2)) \cdot \text{Im}(x(t'_2))$, $2 \cdot \text{Re}(x(t'_3)) \cdot \text{Im}(x(t'_3))$, $2 \cdot \text{Re}(x(t'_4)) \cdot \text{Im}(x(t'_4))$, $2 \cdot \text{Re}(x(t'_5)) \cdot \text{Im}(x(t'_5))$ and $2 \cdot \text{Re}(x(t'_6)) \cdot \text{Im}(x(t'_6))$ which may be the expectation value $E(2 \cdot \text{Re}(x) \cdot \text{Im}(x))$ of formula (2) determined at the first averaging time 728.

Further, the data samples 708 to 716 may be taken within a second time window 742 that is associated with a second averaging time that coincides with the sample time 732 and is referred to by the same reference numeral. The output signal of the first averaging circuit 720 at the second averaging time 732 may be the arithmetic mean of the values of $2 \cdot \text{Re}(x(t'_4)) \cdot \text{Im}(x(t'_4))$, $2 \cdot \text{Re}(x(t'_5)) \cdot \text{Im}(x(t'_5))$, $2 \cdot \text{Re}(x(t'_6)) \cdot \text{Im}(x(t'_6))$, $2 \cdot \text{Re}(x(t'_7)) \cdot \text{Im}(x(t'_7))$ and $2 \cdot \text{Re}(x(t'_8)) \cdot \text{Im}(x(t'_8))$ which may be the expectation value $E(2 \cdot \text{Re}(x) \cdot \text{Im}(x))$ of formula (2) determined at the second averaging time 732. If the first averaging times 728 and 428 coincide then also the second averaging times 732 and 430 coincide. All further time windows are associated with sample times of data samples that are sampled two data samples later in the consecutive order of data samples.

All other aspects of the averaging circuits 720, 722, 724 and 726 of the communication device according to the example of FIG. 7 correspond to those of the averaging circuits 320, 322, 324 and 326. Further, all other aspects of the communication device according to the example of FIG. 7 are provided corresponding to those of the example of FIG. 2.

Figure 8:
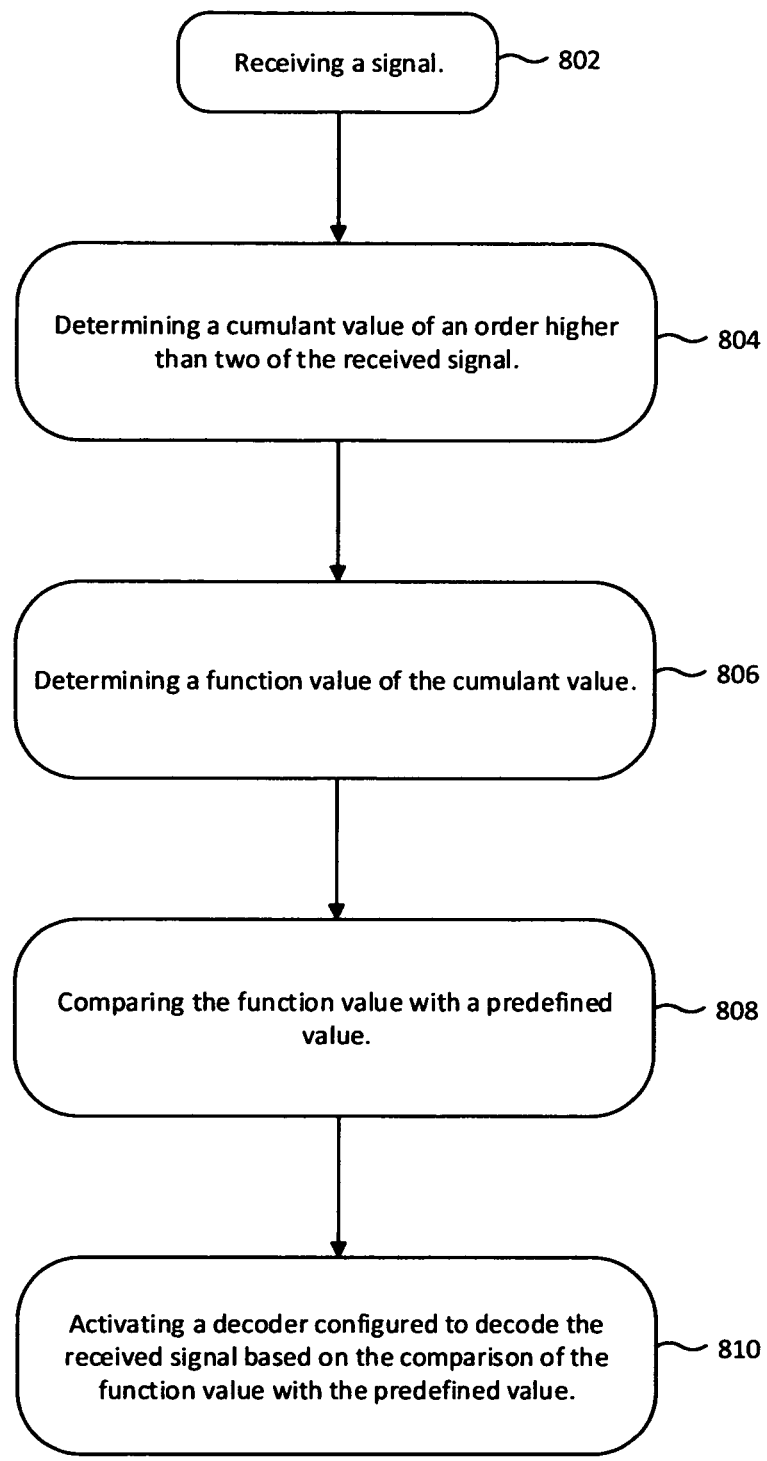
FIG. 8 shows a first method for signal determination in radio communication.

FIG. 8 shows a first method for signal determination in radio communication.

The first method may include, in 802, receiving a signal.

The first method may further include, in 804, determining a cumulant value of an order higher than two of the received signal.

The first method may further include, in 806, determining a function value of the determined cumulant value.

The first method may further include, in 808, comparing the determined function value with a predefined value.

The first method may further include, in 810, activating a decoder configured to decode the received signal based on the comparison of the determined function value with the predefined value.

Figure 9:
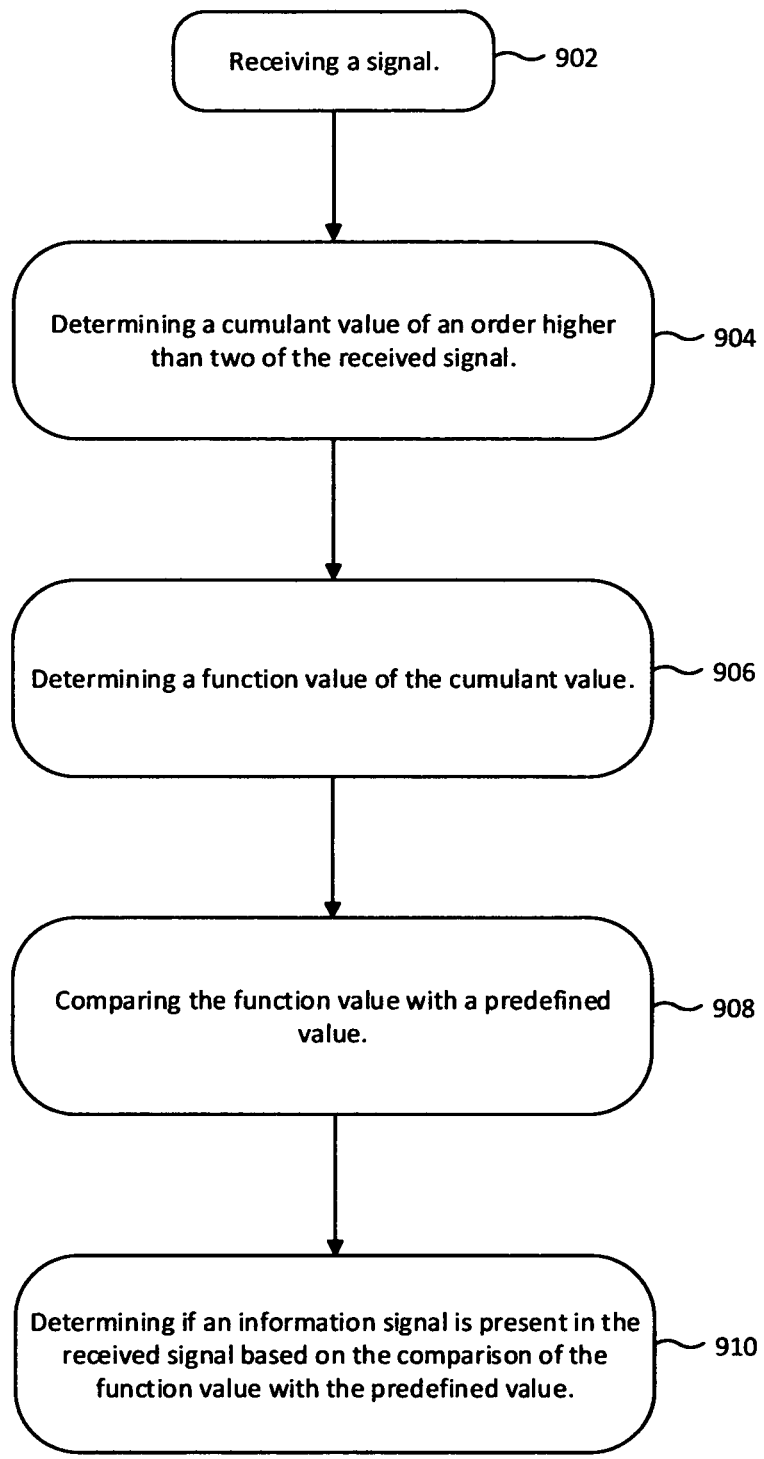
FIG. 9 shows a second method for signal determination in radio communication.

FIG. 9 shows a second method for signal determination in radio communication.

The second method may include, in 902, receiving a signal.

The second method may further include, in 904, determining a cumulant value of an order higher than two of the received signal.

The second method may further include, in 906, determining a function value of the determined cumulant value.

The second method may further include, in 908, comparing the determined function value with a predefined value.

The second method may further include, in 910, determining if an information signal is present in the received signal based on the comparison of the determined function value with the predefined value.

Figure 10:
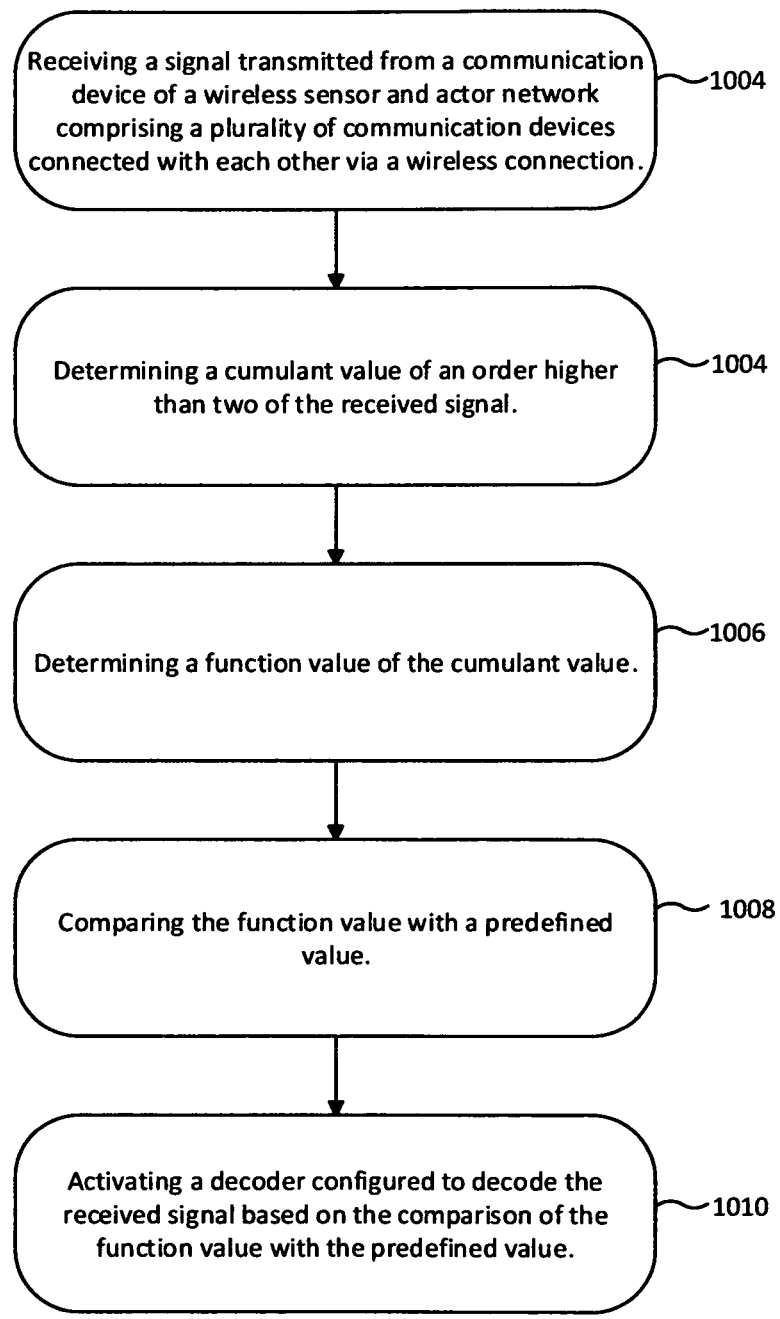
FIG. 10 shows a third method for signal determination associated with a wireless sensor and actor network.

FIG. 10 shows a third method for signal determination associated with a wireless sensor and actor network.

The third method may include, in 1002, receiving a signal transmitted from a communication device of a wireless sensor and actor network including a plurality of communication devices connected with each other via a wireless connection.

The third method may further include, in 1004, determining a cumulant value of an order higher than two of the received signal.

The third method may further include, in 1006, determining a function value of the determined cumulant value.

The third method may further include, 1008, comparing the determined function value with a predefined value.

The third method may further include, in 1010, activating a decoder configured to decode the received signal based on the comparison of the determined function value with the predefined value.

Figure 11:
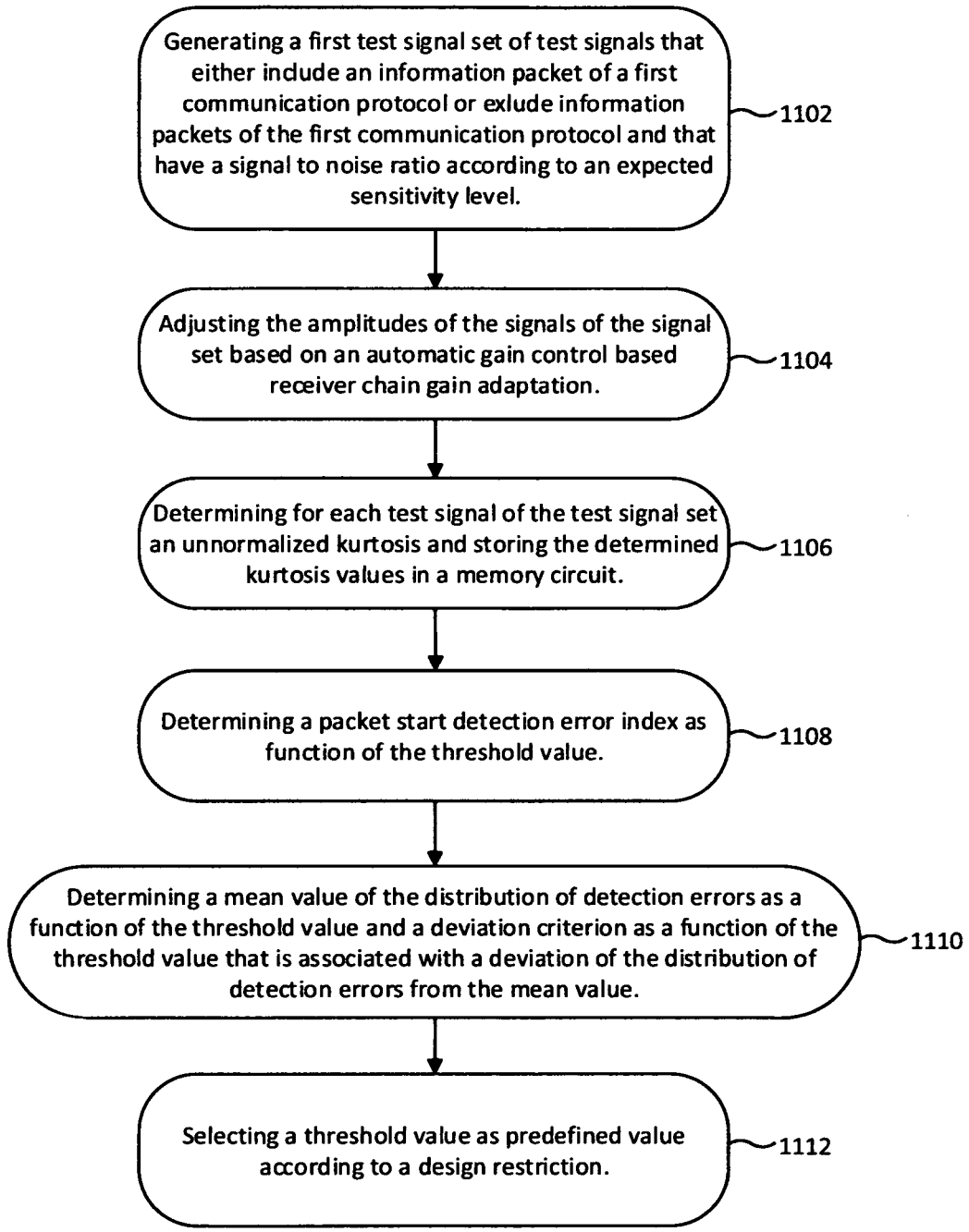
FIG. 11 shows a first method for determining the threshold value that is used in the comparison with the cumulant value in the example of FIG. 1, the example of FIG. 7 and in the methods one to three.

FIG. 11 shows a first method for determining the threshold value that the comparison with the cumulant value is based on in the examples of FIG. 2, FIG. 7 and in the methods for signal determination one to three.

The first method for determining the threshold value may include, in 1102, generating a first test signal set of test signals that either include an information packet of a first communication protocol or exclude information packets of the first communication protocol and that have a signal to noise ratio according to an expected sensitivity level.

The first method for determining the threshold value may further include, in 1104, adjusting the amplitudes of the test signals of the first test signal set based on an automatic gain control based receiver chain gain adaptation.

The first method for determining the threshold value may further include, in 1106, determining for each test signal of the test signal set an unnormalized kurtosis and storing the determined kurtosis values in a memory circuit. The kurtosis may be a fourth order cumulant and may be the determined cumulant value.

The first method for determining the threshold value may further include, in 1108, determining a packet start detection error index as function of the threshold value. The packet start detection error index may be based on a distribution of detection errors that are associated with the test signals of the test signal set for each threshold value.

The first method for determining the threshold value may further include, in 1110, determining a mean value of the distribution of detection errors as a function of the threshold value and a deviation criterion as a function of the threshold value that is associated with a deviation of the distribution of detection errors from the mean value.

The first method for determining the threshold value may further include, in 1112, selecting a threshold value as predefined value according to a design restriction. The design restriction may be avoiding an early detection, avoiding a late detection, avoiding a detection bias and/or 99% of detections associated with the test signals of the tests signal set are correct. In a correct detection no detection error occurs.

Figure 12:
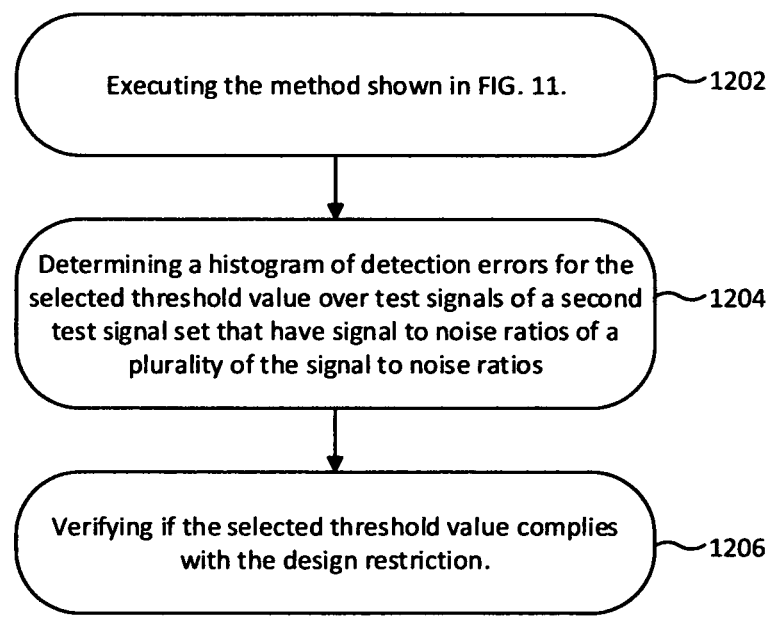
FIG. 12 shows a second method for determining the threshold value that is used in the comparison with the cumulant value in the example of FIG. 1, the example of FIG. 7 and in the methods for signal determination one to three.

FIG. 12 shows a second method for determining the threshold value that is used in the comparison with the cumulant value in the examples of FIG. 2, FIG. 7 and in the methods for signal determination one to three.

The second method for determining the threshold value may include the features of the first method for determining the threshold value and further, in 1204, determining a histogram of detection errors for the selected threshold value over test signals of a second test signal set that have signal to noise ratios of a plurality of signal to noise ratios, respectively.

The second method for determining the threshold value may further include, in 1206, verifying if the selected threshold value complies with the design restriction.

The methods one to five may be applied in consideration of a first communication protocol and a second communication protocol as a sixth method. In the sixth method the predefined value of the methods one to five may be a first predefined value that is associated with the first communication protocol. Further, the sixth method may include defining a second predefined value that is associated with the second communication protocol.

At the execution time the target signal detector may select a value as predefined value from the first predefined value and the second predefined value according to which of the first communication protocol and the second communication protocol is required.

Further, the predefined value may be defined according to the first method for determining the threshold value and further the features of a modified first method for determining the threshold value. Instead of 1102, the modified first method for determining the threshold value may include generating a second test signal set of test signals that either include an information packet of the second communication protocol or exclude information packets of the second communication protocol and that have a signal to noise ratio according to an expected sensitivity level. Further, instead of 1112, the modified first method for determining the threshold value may include selecting a threshold value as predefined value according to a design restriction and according to the first communication protocol and the second communication protocol.

It should be noted that aspects described in the context of the sensors according to the examples of FIG. 2 and FIG. 7 are analogously valid for the methods that are illustrated based on FIG. 8, FIG. 9, FIG. 10, FIG. 11 and FIG. 12.

In the following, various aspects of this disclosure will be illustrated:

Example 1 is a mobile communication device. The communication device may include a receiver configured to receive a signal. The communication device may further include a calculation circuit configured to determine a cumulant value of an order higher than two of the received signal, to determine a function value of the determined cumulant value and to compare the determined function value with a predefined value. The communication device may further include a decoder configured to decode the received signal and a target signal detector configured to activate the decoder based on the comparison of the function value with the predefined value.

In Example 2, the subject matter of Example 1 can optionally include that the target signal detector may be configured to activate the decoder when the determined function value may be greater than the predefined value.

Example 3 is a communication device that may include a receiver configured to receive a signal. The communication device may further include a calculation circuit configured to determine a cumulant value of an order higher than two from the received signal, to determine a function value of the determined cumulant value and to compare the determined function value with a predefined value. The communication device may further include a target signal detector configured to determine if an information signal is present in the received signal based on the comparison of the determined function value with the predefined value.

In Example 4, the subject matter of any one of Examples 1 to 3 can optionally include that the received signal may be a baseband signal.

In Example 5, the subject matter of any one of Examples 1 to 4 can optionally include that the determined function value may be an absolute value of the determined cumulant value.

In Example 6, the subject matter of any one of Examples 1 to 5 can optionally include that the determined cumulant value may be a fourth order cumulant.

In Example 7, the subject matter of any one of Examples 1 to 5 can optionally include that the cumulant may be a fourth order cumulant $\gamma_{4x}=E(|x|^4)-2\cdot(E(|x|^2))^2-(E((Re(x))^2-(Im(x))^2))^2-(E(2\cdot Re(x)\cdot Im(x)))^2$, wherein x may be a complex valued signal function based on the received signal, $|x|$ may be an absolute value x, $(\cdot)^2$ may be a square of $(\cdot)$, E may be an expectation operator that if acting on an argument function determines an expectation value of the argument function, Re(x) may be a real part of x and Im(x) may be an imaginary part of x.

In Example 8, the subject matter of Example 7 can optionally include that x may be a function of the time.

In Example 9, the subject matter of any one of Examples 7 to 8 can optionally include that the argument functions of E may be functions of the time. The expectation value of each argument function may be determined by evaluating the argument function at a predefined time or by obtaining function values by evaluating the argument function at a plurality of times and taking an average of the obtained function values.

In Example 10, the subject matter of Example 9 can optionally include that the expectation value may be determined by obtaining the function values by evaluating the argument function at the plurality of times and taking the average of the obtained function values. The plurality of times may be times within a predefined averaging period. The length of the predefined averaging period may be in a range between the length of a single symbol period of a symbol of a predefined communication protocol and the length of four symbol periods of symbols of the predefined communication protocol.

In Example 11, the subject matter of any one of Examples 6 to 10 can optionally include that the cumulant may be un-normalized.

In Example 12, the subject matter of any one of Examples 1 to 5 can optionally include that the determined cumulant value may be a value of a fourth order cumulant function.

In Example 13, the subject matter of Example 12 can optionally include that the fourth order cumulant function may be defined by $C_{4x}(t, t_1, t_2, t_3)=cum(x^*(t), x(t+t_1), x(t+t_2), x^*(t+t_3))$, wherein $t, t_1, t_2$ and $t_3$ may be times, x(t) may be a complex valued signal function of the time t based on the received signal, $x^*(t)$ may be the complex conjugate function of x(t) and $cum(x^*(t), x(t+t_1), x(t+t_2), x^*(t+t_3))$ may be defined by $cum(x^*(t), x(t+t_1), x(t+t_2), x^*(t+t_3))=E(x^*(t)x(t+t_1)x(t+t_2)x^*(t+t_3))-E(x^*(t)x(t+t_1))E(x(t+t_2)x^*(t+t_3))-E(x^*(t)x(t+t_2))E(x(t+t_1)x^*(t+t_3))-E(x^*(t)x^*(t+t_3))E(x(t+t_1)x(t+t_2))$, wherein E may be an expectation value operator that if acting on an argument function determines an expectation value of the argument function.

In Example 14, the subject matter of Example 13 can optionally include that an expectation value E(q) of the expectation value operator E acting on a function q may be determined by averaging function values $q(t'_1), q(t'_2), \ldots q(t'_n)$ obtained by evaluating q at sample times $t'_1, t'_2, \ldots t'_n$, wherein the function q may be one of the signal function x or the complex conjugate function $x^*$ and n may be a natural number.

In Example 15, the subject matter of Example 14 can optionally include that the sample times $t'_1, t'_2, \ldots t'_n$, may be times within a predefined averaging period that may be in a range between the length of a single symbol period of a symbol of a predefined communication protocol and the length of four symbol periods of symbols of the predefined communication protocol.

In Example 16, the subject matter of any one of Examples 1 to 15 can optionally include that the receiver and/or the decoder may be configured in accordance with single-carrier narrowband modulations.

In Example 17, the subject matter of Example 16 can optionally include that the receiver and/or the decoder may be configured in accordance with at least one signal modulation of a group of signal modulations consisting of Gaussian Frequency Shift Keying, Gaussian Minimum Shift Keying and Quadrature Phase Shift Keying.

In Example 18, the subject matter of any one of Examples 1 to 17 can optionally include that the received signal may be a digitized and down-converted radio frequency signal.

In Example 19, the subject matter of any one of Examples 1 to 18 can optionally include that the receiver and/or the decoder may be configured in accordance with a first communication protocol. The calculation circuit may be configured to determine a first absolute value of a first cumulant value of a first test signal that may include a first noise signal and an information packet of the first communication protocol. The calculation circuit may be configured to determine a second absolute value of a second cumulant value of a second test signal that may include a second noise signal and excludes information packets of the first communication protocol. The target signal detector may be configured to define the predefined value to be a value between the first absolute value and the second absolute value.

In Example 20, the subject matter of Example 19 can optionally include that the target signal detector may be further configured to define the predefined value to be a value lower than the first absolute value and higher than the second absolute value.

In Example 21, the subject matter of any one of Examples 1 to 18 can optionally include that the receiver and/or the decoder may be configured in accordance with a first communication protocol. The calculation circuit may be configured to determine first cumulant values of test signals of a first plurality of test signals, respectively, wherein each test signal of the first plurality of test signals may include a noise signal and an information packet of the first communication protocol. The calculation circuit may be configured to determine first absolute values of the first cumulant values, respectively. The calculation circuit may be configured to determine second cumulant values of test signals of a second plurality of test signals, respectively. Each test signal of the second plurality of test signals may include a noise signal and excludes information packets of the first communication protocol. The calculation circuit may be configured to determine second absolute values of the second cumulant values, respectively. The target signal detector may be configured to define the predefined value to be a value between the lowest first absolute value and the highest second absolute value.

In Example 22, the subject matter of any one of Examples 19 to 21 can optionally include that the receiver and/or the decoder may be further configured in accordance with a second communication protocol. The second test signal further excludes information packets of the second communication protocol. The calculation circuit may be further configured to determine a third absolute value of a third cumulant value of a third test signal that may include a third noise signal and an information packet of the second communication protocol. The calculation circuit may be configured to determine a fourth absolute value of a fourth cumulant value of a fourth test signal that may include a fourth noise signal and may exclude information packets of the first communication protocol and the second communication protocol. The target signal detector may be configured to define the predefined value to be a value between the lower value of the first absolute value and the third absolute value and the higher value of the second absolute value and the fourth absolute value.

In Example 23, the subject matter of any one of Examples 1 to 18 can optionally include that the receiver and/or the decoder may be configured in accordance with a first communication protocol. The target signal detector may be further configured to define the predefined value based on a first definition information and a second definition information. The first definition information may include a first plurality of test signals that each include a noise signal and an information packet of the first communication protocol. The first definition information further may include a first plurality of detection error numbers that may be associated with threshold values of a plurality of threshold values, respectively. The target signal detector may be configured to determine each detection error number of the first plurality of detection error numbers to be a number of detection errors that occur by using the test signals of the first plurality of test signals as received signals and by using the threshold value that may be associated with the each detection error number as predefined value. The second definition information may include a second plurality of test signals that each include a noise signal and exclude information packets of the first communication protocol. The second definition information further may include a second plurality of detection error numbers that may be associated with threshold values of the plurality of threshold values, respectively. The target signal detector may be configured to determine each detection error number of the second plurality of detection error numbers to be a number of detection errors that occur by using the test signals of the second plurality of test signals as received signals and by using the threshold value that may be associated with the each detection error number as predefined value. The target signal detector may be configured to define the predefined value to be the value of the plurality of threshold values that may have the smallest sum of a plurality of sums. Each sum of the plurality of sums may be associated with a threshold value of the plurality of threshold values and may be the sum of the detection error numbers of the first plurality of detection error numbers and the second plurality of detection error numbers that may be associated with the threshold value that the sum may be associated with.

In Example 24, the subject matter of any one of Examples 1 to 18 can optionally include that the receiver and/or the decoder may be configured in accordance with a first communication protocol and a second communication protocol. The target signal detector may be configured to define the predefined value based on a first definition information, a second definition information, a third definition information and a fourth definition information. The first definition information may include a first plurality of test signals that each include a noise signal and an information packet of the first communication protocol. The first definition information further may include a first plurality of detection error numbers that may be associated with threshold values of a plurality of threshold values, respectively. The target signal detector may be configured to determine each detection error number of the first plurality of detection error numbers to be a number of detection errors that occur by using the test signals of the first plurality of test signals as received signals and by using the threshold value that may be associated with the each detection error number as predefined value. The second definition information may include a second plurality of test signals that each include a noise signal and exclude information packets of the first communication protocol. The second definition information further may include a second plurality of detection error numbers that may be associated with threshold values of the plurality of threshold values, respectively. The target signal detector may be configured to determine each detection error number of the second plurality of detection error numbers to be a number of detection errors that occur by using the test signals of the second plurality of test signals as received signals and by using the threshold value that may be associated with the each detection error number as predefined value. The third definition information may include a third plurality of test signals that each include a noise signal and an information packet of the second communication protocol. The third definition information further may include a third plurality of detection error numbers that may be associated with threshold values of the plurality of threshold values, respectively. The target signal detector may be configured to determine each detection error number of the third plurality of detection error numbers to be a number of detection errors that occur by using the test signals of the third plurality of test signals as received signals and by using the threshold value that may be associated with the each detection error number as predefined value. The fourth definition information may include a fourth plurality of test signals that each include a noise signal and exclude information packets of the second communication protocol. The fourth definition information further may include a fourth plurality of detection error numbers that may be associated with threshold values of the plurality of threshold values, respectively. The target signal detector may be configured to determine each detection error number of the fourth plurality of detection error numbers to be a number of detection errors that occur by using the test signals of the fourth plurality of test signals as received signals and by using the threshold value that may be associated with the each detection error number as predefined value. The target signal detector may be configured to define the predefined value to be a value between a first value and a second value. The first value may be a value of the plurality of threshold values that may have the smallest sum of a first plurality of sums. Each sum of the first plurality of sums may be associated with a threshold value of the plurality of threshold values and may be the sum of the detection error numbers of the first plurality of detection error numbers and the second plurality of detection error numbers that may be associated with the threshold value that the sum may be associated with. The second value may be a value of the plurality of threshold values that may have the smallest sum of a second plurality of sums. Each sum of the second plurality of sums may be associated with a threshold value of the plurality of threshold values and may be the sum of the detection error numbers of the third plurality of detection error numbers and the fourth plurality of detection error numbers that may be associated with the threshold value that the sum may be associated with.

In Example 25, the subject matter of any one of Examples 10 to 24 can optionally include that the predefined communication protocol, the first communication protocol and/or the second communication protocol may be communication protocols of a group of communication protocols consisting of ANT, Bluetooth, Bluetooth Low Energy, ZigBee and Global System for Mobile Communications.

Example 26 is a network arrangement. The network arrangement may include at least one wireless sensor and actor network including a plurality of communication devices connected with each other via a wireless connection. Each communication device of the plurality of communication devices may include a receiver configured to receive a signal. Each communication device of the plurality of communication devices may further include a calculation circuit configured to determine a cumulant value of an order higher than two of the received signal, to determine a function value of the determined cumulant value and to compare the determined function value with a predefined value. Each communication device of the plurality of communication devices may further include a decoder configured to decode the received signal and a target signal detector configured to activate the decoder based on the comparison of the determined function value with the predefined value.

In Example 27, the subject matter of Example 23 can optionally include that the wireless sensor and actor network may be a low-power wireless sensor and actor network.

In Example 28, the subject matter of any one of Examples 2 to 18 can optionally include that the receiver and/or the decoder may be configured in accordance with a first communication protocol. The target signal detector may be further configured to define the predefined value based on a plurality of threshold values and a plurality of distributions of detection index error numbers that may be associated with the threshold values of the plurality of threshold values, respectively. The detection index error numbers of each distribution of detection index error numbers may be associated with test signals of a plurality of test signals, respectively. Each test signal of the plurality of test signals may include a plurality of sample signals that may be associated with consecutively ordered sample signal numbers. Each plurality of sample signals may include a first sample signal that may include an information packet of the first communication protocol and the other sample signals of the each plurality of sample signals exclude information packets of the first communication protocol. The calculation circuit may be configured to determine a sample cumulant value of an order higher than two of each sample signal of the pluralities of sample signals, to determine the function value of each cumulant value of the cumulant values and to compare the function values with the threshold values, respectively. The target signal detector may be configured to determine a second sample signal of each plurality of sample signals of the pluralities of sample signals that has the lowest sample signal number of excess sample signals of the each plurality of sample signals that have greater determined function values than the threshold value, respectively. The target signal detector may be configured to determine the detection index error number associated with each test signal of the plurality of test signals to be the sample signal number of the second sample signal minus the sample signal number of the first sample signal. The target signal detector may be configured to predefine the predefined value as a threshold value that may be associated with the distribution of detection index error numbers that has the lowest variance.

Example 29 is a method for signal determination in radio communication. The method may include receiving a signal, determining a cumulant value of an order higher than two of the received signal, determining a function value of the determined cumulant value, comparing the determined function value with a predefined value and activating a decoder configured to decode the received signal based on the comparison of the determined function value with the predefined value.

In Example 30, the subject matter of Examples 29 can optionally include that the method may further include activating the decoder when the determined function value may be greater than the predefined value.

Example 31 is a method for signal determination in radio communication. The method may include receiving a signal, determining a cumulant value of an order higher than two of the received signal, determining a function value of the determined cumulant value, comparing the determined function value with a predefined value and determining if an information signal may be present in the received signal based on the comparison of the determined function value with the predefined value.

In Example 32, the subject matter of any one of Examples 29 to 31 can optionally include that the received signal may be a baseband signal.

In Example 33, the subject matter of any one of Examples 29 to 32 can optionally include that the determined function value may be an absolute value of the determined cumulant value.

In Example 34, the subject matter of any one of Examples 29 to 33 can optionally include that the determined cumulant value may be a fourth order cumulant.

In Example 35, the subject matter of any one of Examples 29 to 34 can optionally include that the cumulant may be a fourth order cumulant $\gamma_{4x}=E(|x|^4)-2\cdot(E(|x|^2))^2-(E((Re(x))^2-(Im(x))^2))^2-(E(2\cdot Re(x)\cdot Im(x)))^2$, wherein x may be a complex valued signal function based on the received signal, $|x|$ may be an absolute value x, $(\cdot)^2$ may be a square of $(\cdot)$, E may be an expectation operator that if acting on an argument function determines an expectation value of the argument function, $Re(x)$ may be a real part of x and $Im(x)$ may be an imaginary part of x.

In Example 36, the subject matter of Example 35 can optionally include that x may be a function of the time.

In Example 37, the subject matter of any one of Examples 35 to 36 can optionally include that the argument functions of E may be functions of the time. The method further may include determining the expectation value of each argument function by evaluating the argument function at a predefined time or by obtaining function values by evaluating the argument function at a plurality of times and taking an average of the obtained function values.

In Example 38, the subject matter of Example 37 can optionally include that the method may further include determining the expectation value by obtaining the function values by evaluating the argument function at the plurality of times and taking the average of the obtained function values. The plurality of times may be times within a predefined averaging period. The length of the predefined averaging period may be in a range between the length of a single symbol period of a symbol of a predefined communication protocol and the length of four symbol periods of symbols of the predefined communication protocol.

In Example 39, the subject matter of any one of Examples 34 to 38 can optionally include that the cumulant may be un-normalized.

In Example 40, the subject matter of any one of Examples 29 to 33 can optionally include that the determined cumulant value may be a value of a fourth order cumulant function.

In Example 41, the subject matter of Example 40 can optionally include that the fourth order cumulant function may be defined by $C_{4x}(t_1, t_2, t_3)=cum(x^*(t), x(t+t_1), x(t+t_2), x^*(t+t_3))$, wherein $t, t_1, t_2$ and $t_3$ may be times, $x(t)$ may be a complex valued signal function of the time t based on the received signal, $x^*(t)$ may be the complex conjugate function of $x(t)$ and $cum(x^*(t), x(t+t_1), x(t+t_2), x^*(t+t_3))$ may be defined by $cum(x^*(t), x(t+t_1), x(t+t_2), x^*(t+t_3))=E(x^*(t)x(t+t_1)x(t+t_2)x^*(t+t_3))-E(x^*(t)x(t+t_1))E(x(t+t_2)x^*(t+t_3))-E(x^*(t)x(t+t_2))E(x(t+t_1)x^*(t+t_3))-E(x^*(t)x^*(t+t_3))E(x(t+t_1)x(t+t_2))$, wherein E may be an expectation value operator that if acting on an argument function determines an expectation value of the argument function.

In Example 42, the subject matter of Example 41 can optionally include that the method may further include determining an expectation value $E(q)$ of the expectation value operator E acting on a function q by averaging function values $q(t'_1), q(t'_2), \ldots q(t'_n)$ obtained by evaluating q at sample times $t'_1, t'_2, \ldots t'_n$ wherein the function q may be one of the signal function x or the complex conjugate function $x^*$ and n may be a natural number.

In Example 43, the subject matter of Example 42 can optionally include that the sample times $t'_1, t'_2, \ldots t'_n$ may be times within a predefined averaging period that may be in a range between the length of a single symbol period of a symbol of a predefined communication protocol and the length of four symbol periods of symbols of the predefined communication protocol.

In Example 44, the subject matter of Example 43 can optionally include that the received signal may be a signal in accordance with single-carrier narrowband modulations.

In Example 45, the subject matter of Example 44 can optionally include that the received signal may be a signal in accordance with at least one signal modulation of a group of signal modulations consisting of Gaussian Frequency Shift Keying, Gaussian Minimum Shift Keying and Quadrature Phase Shift Keying.

In Example 46, the subject matter of any one of Examples 29 to 45 can optionally include that the received signal may be a digitized and down-converted radio frequency signal.

In Example 47, the subject matter of any one of Examples 29 to 46 can optionally include that the method may further include determining a first absolute value of a first cumulant value of a first test signal that may include a first noise signal and an information packet of a first communication protocol. The method may further include determining a second absolute value of a second cumulant value of a second test signal that may include a second noise signal and excludes information packets of the first communication protocol and defusing the predefined value to be a value between the first absolute value and the second absolute value.

In Example 48, the subject matter of Example 47 can optionally include that the method may further include defining the predefined value to be a value lower than the first absolute value and higher than the second absolute value.

In Example 49, the subject matter of any one of Examples 29 to 46 can optionally include that the method may further include determining first cumulant values of test signals of a first plurality of test signals, respectively. Each test signal of the first plurality of test signals may include a noise signal and an information packet of a first communication protocol. The method may further include determining first absolute values of the first cumulant values, respectively. The method may further include determining second cumulant values of test signals of a second plurality of test signals, respectively. Each test signal of the second plurality of test signals may include a noise signal and excludes information packets of the first communication protocol. The method may further include determining second absolute values of the second cumulant values, respectively. The method may further include defiling the predefined value to be a value between the lowest first absolute value and the highest second absolute value.

In Example 50, the subject matter of any one of Examples 47 to 49 can optionally include that the second test signal further may exclude information packets of a second communication protocol. The method further may include determining a third absolute value of a third cumulant value of a third test signal that may include a third noise signal and an information packet of the second communication protocol. The method may further include determining a fourth absolute value of a fourth cumulant value of a fourth test signal that may include a fourth noise signal and may exclude information packets of the first communication protocol and the second communication protocol. The method may further include defining the predefined value to be a value between the lower value of the first absolute value and the third absolute value and the higher value of the second absolute value and the fourth absolute value.

In Example 51, the subject matter of any one of Examples 29 to 46 can optionally include that the method may further include defining the predefined value based on a first definition information and a second definition information. The first definition information may include a first plurality of test signals that each include a noise signal and an information packet of a first communication protocol. The first definition information further may include a first plurality of detection error numbers that may be associated with threshold values of a plurality of threshold values, respectively. The second definition information may include a second plurality of test signals that each include a noise signal and exclude information packets of the first communication protocol. The second definition information further may include a second plurality of detection error numbers that may be associated with threshold values of the plurality of threshold values, respectively. The method further may include determining each detection error number of the first plurality of detection error numbers to be a number of detection errors that occur by using the test signals of the first plurality of test signals as received signals and by using the threshold value that may be associated with the each detection error number as predefined value. The method further may include determining each detection error number of the second plurality of detection error numbers to be a number of detection errors that occur by using the test signals of the second plurality of test signals as received signals and by using the threshold value that may be associated with the each detection error number as predefined value. The method further may include defining the predefined value to be the value of the plurality of threshold values that has the smallest sum of a plurality of sums. Each sum of the plurality of sums may be associated with a threshold value of the plurality of threshold values and may be the sum of the numbers of the first plurality of detection error numbers and the second plurality of detection error numbers that may be associated with the threshold value that the sum may be associated with.

In Example 52, the subject matter of any one of Examples 29 to 46 can optionally include that the method may further include defining the predefined value based on a first definition information, a second definition information, a third definition information and a fourth definition information. The first definition information may include a first plurality of test signals that each include a noise signal and an information packet of a first communication protocol. The first definition information further may include a first plurality of detection error numbers that may be associated with threshold values of a plurality of threshold values, respectively. The second definition information may include a second plurality of test signals that each include a noise signal and exclude information packets of the first communication protocol. The second definition information further may include a second plurality of detection error numbers that may be associated with threshold values of the plurality of threshold values, respectively. The third definition information may include a third plurality of test signals that each include a noise signal and an information packet of a second communication protocol. The third definition information further may include a third plurality of detection error numbers that may be associated with threshold values of the plurality of threshold values, respectively. The fourth definition information may include a fourth plurality of test signals that each include a noise signal and exclude information packets of the second communication protocol. The fourth definition information further may include a fourth plurality of detection error numbers that may be associated with threshold values of the plurality of threshold values, respectively. The method further may include determining each detection error number of the first plurality of detection error numbers to be a number of detection errors that occur by using the test signals of the first plurality of test signals as received signals and by using the threshold value that may be associated with the each detection error number as predefined value. Further, the method may include determining each detection error number of the second plurality of detection error numbers to be a number of detection errors that occur by using the test signals of the second plurality of test signals as received signals and by using the threshold value that may be associated with the each detection error number as predefined value. Moreover, the method may include determining each detection error number of the third plurality of detection error numbers to be a number of detection errors that occur by using the test signals of the third plurality of test signals as received signals and by using the threshold value that may be associated with the each detection error number as predefined value. Further, the method may include determining each detection error number of the fourth plurality of detection error numbers to be a number of detection errors that occur by using the test signals of the fourth plurality of test signals as received signals and by using the threshold value that may be associated with the each detection error number as predefined value. Further, the method may include defining the predefined value to be a value between a first value and a second value. The first value may be a value of the plurality of threshold values that may have the smallest sum of a first plurality of sums. Each sum of the first plurality of sums may be associated with a threshold value of the plurality of threshold values and may be the sum of the detection error numbers of the first plurality of detection error numbers and the second plurality of detection error numbers that may be associated with the threshold value that the sum may be associated with. The second value may be a value of the plurality of threshold values that has the smallest sum of a second plurality of sums. Each sum of the second plurality of sums may be associated with a threshold value of the plurality of threshold values and may be the sum of the detection error numbers of the third plurality of detection error numbers and the fourth plurality of detection error numbers that may be associated with the threshold value that the sum may be associated with.

In Example 53, the subject matter of any one of Examples 38 to 52 can optionally include that the predefined communication protocol, the first communication protocol and/or the second communication protocol may be communication protocols of a group of communication protocols consisting of ANT, Bluetooth, Bluetooth Low Energy, ZigBee and Global System for Mobile Communications.

Example 54 is a method for signal determination in radio communication. The method may include receiving a signal transmitted from a communication device of a wireless sensor and actor network including a plurality of communication devices connected with each other via a wireless connection. Further, the method may include determining a cumulant value of an order higher than two of the received signal. Moreover, the method may include determining a function value of the determined cumulant value. Further, the method may include comparing the determined function value with a predefined value. Moreover, the method may include activating a decoder configured to decode the received signal based on the comparison of the determined function value with the predefined value.

In Example 55, the subject matter of Example 54 can optionally include that the wireless sensor and actor network may be a low-power wireless sensor and actor network.

In Example 56, the subject matter of any one of Examples 30 to 55 can optionally include that the method may further include defining the predefined value based on a plurality of threshold values and a plurality of distributions of detection index error numbers that may be associated with the threshold values of the plurality of threshold values, respectively. The detection index error numbers of each distribution of detection index error numbers may be associated with test signals of a plurality of test signals, respectively. Each test signal of the plurality of test signals may include a plurality of sample signals that may be associated with consecutively ordered sample signal numbers. Each plurality of sample signals may include a first sample signal that may include an information packet of the first communication protocol and the other sample signals of the each plurality of sample signals exclude information packets of the first communication protocol. Further, the method may include determining a sample cumulant value of an order higher than two of each sample signal of the pluralities of sample signals, determining the function value of each cumulant value of the cumulant values and comparing the determined function values with the threshold values, respectively. Moreover, the method may include determining a second sample signal of each plurality of sample signals of the pluralities of sample signals that may have the lowest sample signal number of excess sample signals of the each plurality of sample signals that have greater determined function values than the threshold value, respectively. Further, the method may include determining the detection index error number associated with each test signal of the plurality of test signals to be the sample signal number of the second sample signal minus the sample signal number of the first sample signal. Moreover, the method may include predefining the predefined value as a threshold value that may be associated with the distribution of detection index error numbers that has the lowest variance.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication device, comprising:
a receiver configured to receive a signal;
a calculation circuit configured to determine a cumulant value of an order higher than two of the received signal, to determine a function value of the determined cumulant value and to compare the determined function value with a predefined value; wherein the cumulant is a fourth order cumulant $\gamma_{4x}=E(|x|^4)-2\cdot(E(|x|^2))^2-(E((Re(x))^2-(Im(x))^2))^2-(E(2\cdot Re(x)\cdot Im(x)))^2$, wherein x is a complex valued signal function based on the received signal, |x| is an absolute value x, $(\cdot)^2$ is a square of $(\cdot)$, E is an expectation operator that if acting on an argument function determines an expectation value of the argument function Re(x) is a real part of x and Im(x) is an imaginary part of x;
a decoder configured to decode the received signal; and
a target signal detector configured to activate the decoder based on the comparison of the function value with the predefined value.

2. The communication device of claim 1,
wherein the target signal detector is configured to activate the decoder when the determined function value is greater than the predefined value.

3. A communication device, comprising:
a receiver configured to receive a signal;
a calculation circuit configured to determine a fourth order cumulant value from the received signal, to determine a function value of the determined cumulant value and to compare the determined function value with a predefined value; wherein the fourth order cumulant function is defined by $C_{4x}(t,t_1,t_2,t_3)=\text{cum}(x^*(t),x(t+t_1),x(t+t_2),x^*(t+t_3))$, wherein t, $t_1$, $t_2$, and $t_3$ are times, x(t) is a complex valued signal function of the time t based on the received signal, $x^*(t)$ is the complex conjugate function of x(t) and $\text{cum}(x^*(t),x(t+t_1),x(t+t_2),x^*(t+t_3))$ is defined by $\text{cum}(x^*(t),x(t+t_1),x(t+t_2),x^*(t+t_3))=E(x^*(t)x(t+t_1)x(t+t_2)x^*(t+t_3))-E(x^*(t)x(t+t_1))E(x(t+t_2)x^*(t+t_3))-E(x^*(t)x(t+t_2))E(x(t+t_1)x^*(t+t_3))-E(x^*(t)x^*(t+t_3))E(x(t+t_1)x(t+t_2))$, wherein E is an expectation value operator that if acting on an argument function determines an expectation value of the argument function; and
a target signal detector configured to determine whether an information packet from a predefined radio communication protocol is present in the received signal based on the comparison of the determined function value with the predefined value.

4. The communication device of claim 1,
wherein the determined function value is an absolute value of the determined cumulant value.

5. The communication device of claim 1,
wherein the argument functions of E' are functions of the time; and
wherein the expectation value of each argument function is determined by evaluating the argument function at a predefined time or by obtaining function values by evaluating the argument function at a plurality of times and taking an average of the obtained function values.

6. The communication device of claim 5,
wherein the expectation value is determined by obtaining the function values by evaluating the argument function at the plurality of times and taking the average of the obtained function values;
wherein the plurality of times are times within a predefined averaging period; and
wherein the length of the predefined averaging period is in a range between the length of a single symbol period of a symbol of a predefined communication protocol and the length of four symbol periods of symbols of the predefined communication protocol.

7. The communication device of claim 1,
wherein the receiver and/or the decoder are configured in accordance with single-carrier narrowband modulations.

8. The communication device of claim 7,
wherein the receiver and/or the decoder are configured in accordance with a first communication protocol;
wherein the calculation circuit is configured to determine a first absolute value of a first cumulant value of a first test signal that includes a first noise signal and an information packet of the first communication protocol;
wherein the calculation circuit is configured to determine a second absolute value of a second cumulant value of a second test signal that includes a second noise signal and excludes information packets of the first communication protocol; and
wherein the target signal detector is configured to define the predefined value to be a value between the first absolute value and the second absolute value.

9. The communication device of claim 4,
wherein the receiver and/or the decoder are configured in accordance with a first communication protocol;
wherein the target signal detector is further configured to define the predefined value based on a plurality of threshold values and a plurality of distributions of detection index error numbers that are associated with the threshold values of the plurality of threshold values, respectively;
wherein the detection index error numbers of each distribution of detection index error numbers are associated with test signals of a plurality of test signals, respectively;
wherein each test signal of the plurality of test signals comprises a plurality of sample signals that are associated with consecutively ordered sample signal numbers;
wherein each plurality of sample signals comprises a first sample signal that comprises an information packet of the first communication protocol and the other sample signals of the each plurality of sample signals exclude information packets of the first communication protocol;
wherein the calculation circuit is configured to determine a sample cumulant value of an order higher than two of each sample signal of the pluralities of sample signals, to determine the function value of each cumulant value of the cumulant values and to compare the function values with the threshold values, respectively;
wherein the target signal detector is configured to determine a second sample signal of each plurality of sample signals of the pluralities of sample signals that has the lowest sample signal number of excess sample signals of the each plurality of sample signals that have greater determined function values than the threshold value, respectively;
wherein the target signal detector is configured to determine the detection index error number associated with each test signal of the plurality of test signals to be the sample signal number of the second sample signal minus the sample signal number of the first sample signal;
wherein the target signal detector is configured to predefine the predefined value as a threshold value that is associated with the distribution of detection index error numbers that has the lowest variance.

10. A method for signal determination in radio communication, comprising:
receiving a signal;
determining a cumulant value of an order higher than two of the received signal;
wherein the cumulant is a fourth order cumulant $\gamma_{4x}=E(|x|^4)-2\cdot(E(|x|^2))^2-(E((Re(x))^2-(Im(x))^2))^2-(E(2\cdot Re(x)\cdot Im(x)))^2$, wherein x is a complex valued signal function based on the received signal, |x| is an absolute value x, $(\cdot)^2$ is a square of $(\cdot)$, E is an expectation operator that if acting on an argument function determines an expectation value of the argument function Re(x) is a real part of x and Im(x) is an imaginary part of x;
determining a function value of the determined cumulant value;
comparing the determined function value with a predefined value; and
activating a decoder configured to decode the received signal based on the comparison of the determined function value with the predefined value.

11. The method of claim 10, further comprising:
activating the decoder when the determined function value is greater than the predefined value.

12. A method for signal determination in radio communication, comprising:
receiving a signal;
determining a fourth order cumulant value of an order higher than two of the received signal;
determining a function value of the determined cumulant value; wherein the fourth order cumulant function is defined by $C_{4x}(t,t_1,t_2,t_3)=\text{cum}(x^*(t),x(t+t_1),x(t+t_2),x^*(t+t_3))$, wherein t, $t_1$, $t_2$ and $t_3$ are times, x(t) is a complex valued signal function of the time t based on the received signal, $x^*(t)$ is the complex conjugate function of x(t) and $\text{cum}(x^*(t),x(t+t_1),x(t+t_2),x^*(t+t_3))$ is defined by $\text{cum}(x^*(t),x(t+t_1),x(t+t_2),x^*(t+t_3))=E(x^*(t)x(t+t_1)x(t+t_2)x^*(t+t_3))-E(x^*(t)x(t+t_1))E(x(t+t_2)x^*(t+t_3))-E(x^*(t)x(t+t_2))E(x(t+t_1)x^*(t+t_3))-E(x^*(t)x^*(t+t_3))E(x(t+t_1)x(t+t_2))$, wherein E is an expectation value operator that if acting on an argument function determines an expectation value of the argument function;
comparing the determined function value with a predefined value; and
determining whether an information packet from a predefined short-range radio communication protocol is present in the received signal based on the comparison of the determined function value with the predefined value.

13. The method of claim 11,
wherein the determined function value is an absolute value of the determined cumulant value.

14. The method of claim 10,
wherein the argument functions of E are functions of the time; and
wherein the method further comprises:
determining the expectation value of each argument function by evaluating the argument function at a predefined time or by obtaining function values by evaluating the argument function at a plurality of times and taking an average of the obtained function values.

15. The method of claim 14, further comprising:
determining the expectation value by obtaining the function values by evaluating the argument function at the plurality of times and taking the average of the obtained function values,
wherein the plurality of times are times within a predefined averaging period, and
wherein the length of the predefined averaging period is in a range between the length of a single symbol period of a symbol of a predefined communication protocol and the length of four symbol periods of symbols of the predefined communication protocol.

16. The method of claim 12, further comprising:
determining a first absolute value of a first cumulant value of a first test signal that includes a first noise signal and an information packet of a first communication protocol;
determining a second absolute value of a second cumulant value of a second test signal that includes a second noise signal and excludes information packets of the first communication protocol; and
defining the predefined value to be a value between the first absolute value and the second absolute value.

17. The method of claim 12, further comprising:
defining the predefined value based on a plurality of threshold values and a plurality of distributions of detection index error numbers that are associated with the threshold values of the plurality of threshold values, respectively, wherein the detection index error numbers of each distribution of detection index error numbers are associated with test signals of a plurality of test signals, respectively, wherein each test signal of the plurality of test signals comprises a plurality of sample signals that are associated with consecutively ordered sample signal numbers, wherein each plurality of sample signals comprises a first sample signal that comprises an information packet of the first communication protocol and the other sample signals of the each plurality of sample signals exclude information packets of the first communication protocol;

determining a sample cumulant value of an order higher than two of each sample signal of the pluralities of sample signals, determining the function value of each cumulant value of the cumulant values comparing the determined function values with the threshold values, respectively;

determining a second sample signal of each plurality of sample signals of the pluralities of sample signals that has the lowest sample signal number of excess sample signals of the each plurality of sample signals that have greater determined function values than the threshold value, respectively;

determining the detection index error number associated with each test signal of the plurality of test signals to be the sample signal number of the second sample signal minus the sample signal number of the first sample signal; and predefining the predefined value as a threshold value that is associated with the distribution of detection index error numbers that has the lowest variance.

\* \* \* \* \*

UNITED STATES PATENT AND TRADEMARK OFFICE
CERTIFICATE OF CORRECTION

PATENT NO. : 9,806,921 B2  Page 1 of 1
APPLICATION NO. : 14/998117
DATED : October 31, 2017
INVENTOR(S) : Arditti Ilitzky et al.

It is certified that error appears in the above-identified patent and that said Letters Patent is hereby corrected as shown below:

Column 30, Line 30: Please delete "E'" between the words "of" and "are", and insert --E-- in place thereof.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*